United States Patent
Zhang et al.

(10) Patent No.: US 12,469,055 B2
(45) Date of Patent: Nov. 11, 2025

(54) ADVERTISEMENT DISPLAY METHOD, APPARATUS, AND SYSTEM

(71) Applicant: HUAWEI TECHNOLOGIES CO., LTD., Guangdong (CN)

(72) Inventors: Yun Zhang, Nanjing (CN); Youqi Jin, Nanjing (CN); Ming Jiang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 105 days.

(21) Appl. No.: 18/547,972

(22) PCT Filed: Dec. 17, 2021

(86) PCT No.: PCT/CN2021/139133
§ 371 (c)(1),
(2) Date: Aug. 25, 2023

(87) PCT Pub. No.: WO2022/179267
PCT Pub. Date: Sep. 1, 2022

(65) Prior Publication Data
US 2024/0296483 A1 Sep. 5, 2024

(30) Foreign Application Priority Data
Feb. 27, 2021 (CN) .......................... 202110221822.2

(51) Int. Cl.
*G06Q 30/02* (2023.01)
*G06F 8/61* (2018.01)
*G06Q 30/0241* (2023.01)

(52) U.S. Cl.
CPC .......... *G06Q 30/0277* (2013.01); *G06F 8/61* (2013.01)

(58) Field of Classification Search
CPC .. G06F 8/61; G06Q 30/0267; G06Q 30/0601; G06Q 30/0263; G06Q 30/0207–30/0277; H04L 67/53; H04L 67/56; H04W 4/50
See application file for complete search history.

(56) References Cited

U.S. PATENT DOCUMENTS

| 10,963,926 B1 * | 3/2021 | Nath ................... G06Q 30/0276 |
| 2010/0299213 A1 * | 11/2010 | Yeganeh ................ G06Q 30/02 705/14.71 |
| 2010/0324999 A1 * | 12/2010 | Conway ................ G06Q 30/02 705/14.73 |

(Continued)

FOREIGN PATENT DOCUMENTS

| CN | 101499156 A | 8/2009 |
| CN | 101600164 A | 12/2009 |

(Continued)

OTHER PUBLICATIONS

Extended European Search Report in European Appln No. 21927691.2, dated Mar. 13, 2024, 10 pages.

(Continued)

*Primary Examiner* — Thuy N Nguyen
(74) *Attorney, Agent, or Firm* — Fish & Richardson P.C.

(57) ABSTRACT

In an example method, after an electronic device sends a first request to a first server, the first server may obtain an advertisement from an advertisement server and send the advertisement to the electronic device, and the electronic device displays the advertisement.

16 Claims, 24 Drawing Sheets

(56) References Cited

U.S. PATENT DOCUMENTS

| | | | |
|---|---|---|---|
| 2015/0033219 A1* | 1/2015 | Breiner | G06F 8/61 717/174 |
| 2015/0178779 A1* | 6/2015 | Malone | G06Q 30/0277 705/14.58 |
| 2015/0317678 A1* | 11/2015 | Huang | G06Q 30/0256 705/14.54 |
| 2016/0162934 A1* | 6/2016 | Sega | H04L 67/53 705/14.46 |
| 2016/0350798 A1* | 12/2016 | Kornacki | H04L 67/34 |
| 2018/0053021 A1* | 2/2018 | Rasheed | G06K 7/1417 |
| 2019/0361952 A1* | 11/2019 | Du | G06F 16/532 |
| 2020/0126112 A1* | 4/2020 | Leonard | G06F 8/61 |
| 2020/0175549 A1* | 6/2020 | Pang | H04N 21/44204 |
| 2022/0179665 A1* | 6/2022 | Rathod | G06F 9/451 |

FOREIGN PATENT DOCUMENTS

| | | |
|---|---|---|
| CN | 105897840 A | 8/2016 |
| CN | 106530012 A | 3/2017 |
| CN | 110533457 A | 12/2019 |
| CN | 112422995 A | 2/2021 |
| EP | 2787711 A1 | 10/2014 |

OTHER PUBLICATIONS

International Search Report and Written Opinion in International Appln. No. PCT/CN2021/139133, mailed on Mar. 16, 2022, 18 pages (with English translation).

* cited by examiner

ADVERTISEMENT DISPLAY METHOD, APPARATUS, AND SYSTEM

CROSS-REFERENCE TO RELATED APPLICATIONS

This application is a national stage of International Application No. PCT/CN2021/139133 filed on Dec. 17, 2021, which claims priority to Chinese Patent Application No. 202110221822.2 filed on Feb. 27, 2021. Both of the aforementioned applications are hereby incorporated by reference in their entireties.

TECHNICAL FIELD

This application relates to the communication field, and in particular, to an advertisement display method, an apparatus, and a system.

BACKGROUND

With the vigorous development of Internet technologies, electronic devices such as smartphones and tablet computers have become one of main platforms for pushing advertisements. A page provided by an application installed in the electronic device may include an advertising space, and the advertising space may be used to display an advertisement. A user can access an advertisement landing page by tapping an advertisement in an advertising space. The advertisement landing page may display a series of advertisements, so that the user can experience services, such as virtual reality (virtual reality, VR)/augmented reality (augmented reality, AR) and application installation, on the advertisement landing page.

However, currently, a speed of displaying an advertisement in an advertising space in an application is very low, which reduces a probability that the user enters an advertisement landing page corresponding to the advertisement by tapping the advertisement, and further reduces a conversion rate of the advertisement landing page. This affects not only advertising experience of the user, but also interests of an advertiser.

SUMMARY

This application provides an advertisement display method, an apparatus, and a system, to improve advertisement display efficiency of an electronic device, and improve user experience.

According to a first aspect, this application provides an advertisement display method. The method is applied to a communication system including an electronic device, a first server, and an advertisement server. The method includes the following steps: The electronic device sends a first request to the first server. The first server obtains first advertisement information based on the first request, where the first advertisement information includes an advertising space ID. The first server sends a second request to the advertisement server, where the second request includes the advertising space ID. The advertisement server obtains second advertisement information based on the advertising space ID, and sends the second advertisement information to the first server, where the second advertisement information includes a first advertisement corresponding to the advertising space ID. The first server sends the second advertisement information to the electronic device. The electronic device displays a first interface, where the first interface includes the first advertisement.

Due to implementation of the method according to the first aspect, the electronic device obtains an advertisement from the advertisement server through the first server. Therefore, advertisement display efficiency of the electronic device can be improved, and user experience can be improved.

With reference to the first aspect, in an implementation, the first request further includes the advertising space ID. The first server may obtain an advertisement corresponding to the advertising space ID from the advertisement server based on the advertising space ID. In this way, when starting an application, the electronic device may obtain a splash advertisement corresponding to the advertising space ID.

With reference to the first aspect, in an implementation, the first advertisement information further includes a first position of an advertising space and in the first interface; and after the first server obtains the first advertisement information, the first server sends the first position of the advertising space and in the first interface to the electronic device. In this way, the electronic device may display the first advertisement at the position of the advertising space and in the first interface.

With reference to the first aspect, in an implementation, the first server obtains application content based on the first request; and the first server sends the application content to the electronic device. In this way, the electronic device may display the application content in the first interface.

With reference to the first aspect, in an implementation, before the electronic device sends the first request to the first server, the electronic device detects a first operation, where the first operation is an operation of starting a first application or an operation of switching a page of the first application. In this way, the electronic device may display the first advertisement in any page of the first application.

With reference to the first aspect, in an implementation, the second advertisement information includes an advertisement landing page address. After the electronic device displays the first interface, the electronic device detects a second operation. In response to the second operation, the electronic device obtains a corresponding advertisement landing page from the advertisement server based on the advertisement landing page address. In this way, the electronic device may display the advertisement landing page in a second interface.

With reference to the first aspect, in an implementation, the advertisement landing page includes a VR/AR advertising material. In this way, the electronic device may display the VR/AR advertising material in the advertisement landing page.

With reference to the first aspect, in an implementation, a system-level VR/AR engine and a system-level advertisement service kit are installed in the electronic device. The advertisement server obtains an advertisement landing page address corresponding to an advertisement in the following manner. The advertisement server obtains an advertisement landing page address described in a first language corresponding to the advertisement, and converts the advertisement landing page address from the first language into a second language, where the second language is a language that can be identified by the advertisement service kit. In response to the detected first operation, the electronic device obtains the corresponding advertisement landing page from the advertisement server based on the advertisement landing page address. Then, in response to the detected first operation, an application in the electronic device sends the advertisement landing page address described in the second language to the advertisement service kit, and invokes the advertisement service kit to obtain the advertisement landing page corresponding to the advertisement landing page address. Finally, the advertisement service kit in the electronic device invokes the VR/AR engine to display the advertisement landing page. In this way, the electronic device may jump from a page displayed by the application to the advertisement landing page provided by the advertisement service kit, and display the VR/AR material in the advertisement landing page.

With reference to the first aspect, in an implementation, the advertisement landing page includes a VR/AR advertising material. After the electronic device detects the second operation, the electronic device detects a third operation. The electronic device downloads a VR/AR engine in response to the third operation. In this way, the electronic device may invoke the VR/AR engine to display the VR/AR advertising material in the advertisement landing page.

With reference to the first aspect, in an implementation, the first application in the electronic device is integrated with an advertisement software development kit SDK. The advertisement server obtains an advertisement landing page address described in a first language corresponding to an advertisement, where the first language is a language that can be identified by the advertisement SDK. In response to the detected first operation, the electronic device obtains the corresponding advertisement landing page from the advertisement server based on the advertisement landing page address, and displays the advertisement landing page. In this way, the electronic device may jump from a page displayed by the application to the advertisement landing page provided by the advertisement SDK, and display the VR/AR material in the advertisement landing page.

With reference to the first aspect, in an implementation, after the electronic device displays the advertisement landing page, the electronic device detects a fourth operation. The electronic device installs a second application in response to the fourth operation. In this way, the electronic device may perform an operation of installing the second application in the advertisement landing page.

With reference to the first aspect, in an implementation, the electronic device stores an application list. The application list includes one or more applications. In response to the detected fourth operation, the electronic device detects whether the second application is included in the application list, and if yes, installs the second application. In this way, the electronic device may determine, based on whether a user enters the fourth operation, whether to install the second application.

With reference to the first aspect, in an implementation, the security level of an application included in the application list exceeds a threshold. The security level of the application is determined based on one or more of the following: a permission range of the application and a type of the application. A larger permission range of the application leads to a lower security level of the application. In this case, the electronic device may download and install an application with a relatively high security level in response to the fourth operation.

With reference to the first aspect, in an implementation, the application list is obtained by the electronic device from the advertisement server or is preset in the electronic device. Therefore, the electronic device may obtain the application list in a plurality of manners.

With reference to the first aspect, in an implementation, the first application in the electronic device is integrated with an advertisement software development kit SDK. In response to the fourth operation detected by the electronic device, the advertisement SDK in the electronic device outputs indication information used for indicating that the first application has been installed. The electronic device receives a fifth operation, and installs the second application in response to the fifth operation. In this way, the electronic device may install the application in the advertisement landing page.

According to a second aspect, this application provides an advertisement display method. The method is applied to an electronic device. The method includes the following steps: The electronic device sends a first request to a first server, where the first request is used by the first server to obtain first advertisement information, the first advertisement information includes an advertising space ID, the first request is further used by the first server to send a second request to an advertisement server, and the second request includes the advertising space ID. The electronic device receives second advertisement information sent by the first server, where the second advertisement information is obtained by the advertisement server based on the second request sent by the first server, and the second advertisement information includes a first advertisement corresponding to the advertising space ID. The electronic device displays a first interface, where the first interface includes the first advertisement.

Due to implementation of the method according to the second aspect, the electronic device can obtain an advertisement from the advertisement server through the first server. Therefore, advertisement display efficiency of the electronic device can be improved, and user experience can be improved.

With reference to the second aspect, in an implementation, the first request further includes the advertising space ID. The first server may obtain an advertisement corresponding to the advertising space ID from the advertisement server based on the advertising space ID. In this way, when starting an application, the electronic device may obtain a splash advertisement corresponding to the advertising space ID.

With reference to the second aspect, in an implementation, the first advertisement information further includes a first position of an advertising space and in the first interface; and before the electronic device displays the first interface, the electronic device receives the position that is of the advertising space and in the first interface and that is sent by the first server. In this way, the electronic device may display the first advertisement at the position of the advertising space and in the first interface.

With reference to the second aspect, in an implementation, the electronic device receives application content sent by the first server, where the application content is obtained by the first server in response to the first request. In this way, the electronic device may display the application content in the first interface.

With reference to the second aspect, in an implementation, before the electronic device sends the first request to the first server, the electronic device detects a first operation, where the first operation is an operation of starting a first application or an operation of switching a page of the first application. In this way, the electronic device may display the first advertisement in any page of the first application.

With reference to the second aspect, in an implementation, the second advertisement information includes an advertisement landing page address. After the electronic device displays the first interface, the electronic device detects a second operation. In response to the second operation, the electronic device obtains a corresponding advertisement landing page from the advertisement server based on the advertisement landing page address. In this way, the electronic device may display the advertisement landing page in a second interface.

With reference to the second aspect, in an implementation, the advertisement landing page includes a VR/AR advertising material. In this way, the electronic device may display the VR/AR advertising material in the advertisement landing page.

With reference to the second aspect, in an implementation, the advertisement landing page includes a VR/AR advertising material. After the electronic device detects the second operation, the electronic device detects a third operation. The electronic device downloads a VR/AR engine in response to the third operation. In this way, the electronic device may invoke the VR/AR engine to display the VR/AR advertising material in the advertisement landing page.

With reference to the second aspect, in an implementation, after the electronic device displays the advertisement landing page, the electronic device detects a fourth operation. The electronic device installs a second application in response to the fourth operation. In this way, the electronic device may perform an operation of installing the second application in the advertisement landing page.

With reference to the second aspect, in an implementation, the electronic device stores an application list. The application list includes one or more applications. In response to the detected fourth operation, the electronic device detects whether the second application is included in the application list, and if yes, installs the second application. In this way, the electronic device may determine, based on whether a user enters the fourth operation, whether to install the second application.

With reference to the second aspect, in an implementation, after the electronic device displays the advertisement landing page, the electronic device detects a fourth operation. The electronic device installs a second application in response to the fourth operation. In this way, the electronic device may perform an operation of installing the second application in the advertisement landing page.

With reference to the second aspect, in an implementation, the electronic device stores an application list. The application list includes one or more applications. In response to the detected fourth operation, the electronic device detects whether the second application is included in the application list, and if yes, installs the second application. In this way, the electronic device may determine, based on whether a user enters the fourth operation, whether to install the second application.

With reference to the second aspect, in an implementation, the security level of an application included in the application list exceeds a threshold. The security level of the application is determined based on one or more of the following: a permission range of the application and a type of the application. A larger permission range of the application leads to a lower security level of the application. In this case, the electronic device may download and install an application with a relatively high security level in response to the fourth operation.

With reference to the second aspect, in an implementation, the application list is obtained by the electronic device from the advertisement server or is preset in the electronic device. Therefore, the electronic device may obtain the application list in a plurality of manners.

With reference to the second aspect, in an implementation, the first application in the electronic device is integrated with an advertisement software development kit SDK. In response to the fourth operation detected by the electronic device, the advertisement SDK in the electronic device outputs indication information used for indicating that the first application has been installed. The electronic device receives a fifth operation, and installs the second application in response to the fifth operation. In this way, the electronic device may install the application in the advertisement landing page.

According to a third aspect, this application provides an advertisement display method. The method is applied to an advertisement server. The method includes the following steps: The advertisement server receives a second request sent by a first server, where the second request includes an advertising space ID. The advertisement server obtains second advertisement information based on the advertising space ID, and sends the second advertisement information to an electronic device through the first server, where the second advertisement information includes a first advertisement corresponding to the advertising space ID.

Due to implementation of the method according to the third aspect, the electronic device obtains an advertisement from the advertisement server through the first server. Therefore, advertisement display efficiency of the electronic device can be improved, and user experience can be improved.

With reference to the third aspect, in an implementation, the second advertisement information includes an advertisement landing page address. After the advertisement server sends the second advertisement information to the electronic device through the first server, the method further includes. The advertisement server sends an advertisement landing page corresponding to the advertisement landing page address to the electronic device. In this way, the electronic device may display the advertisement landing page.

With reference to the third aspect, in an implementation, the advertisement landing page includes a VR/AR advertising material. In this way, the electronic device may display the VR/AR advertising material in the advertisement landing page.

According to a fourth aspect, an embodiment of this application provides an electronic device. The electronic device includes one or more processors and one or more memories. The one or more memories are coupled to the one or more processors. The one or more memories are configured to store computer program code. The computer program code includes computer instructions. When the one or more processors execute the computer instructions, the electronic device is enabled to perform the method according to any implementation of the second aspect or the third aspect.

According to a fifth aspect, an embodiment of this application provides a computer program product, including instructions. When the computer program product runs on an electronic device, the electronic device is enabled to perform the method according to any implementation of the second aspect or the third aspect.

According to a sixth aspect, an embodiment of this application provides a computer-readable storage medium, including instructions. When the instructions run on an electronic device, the electronic device is enabled to perform the method according to any implementation of the second aspect or the third aspect.

According to a seventh aspect, an embodiment of this application provides a communication system. The communication system includes an electronic device, a first server, and an advertisement server. The electronic device is configured to perform the method according to any implementation of the second aspect or the third aspect.

After the advertisement display method provided in this application is implemented, advertisement display efficiency of the electronic device can be improved; and the electronic device can display the advertisement landing page, and provide a VR/AR service or an application installation service in the advertisement landing page, thereby improving user experience and improving the conversion rate of the advertisement landing page.

DESCRIPTION OF EMBODIMENTS

Figure 1A:
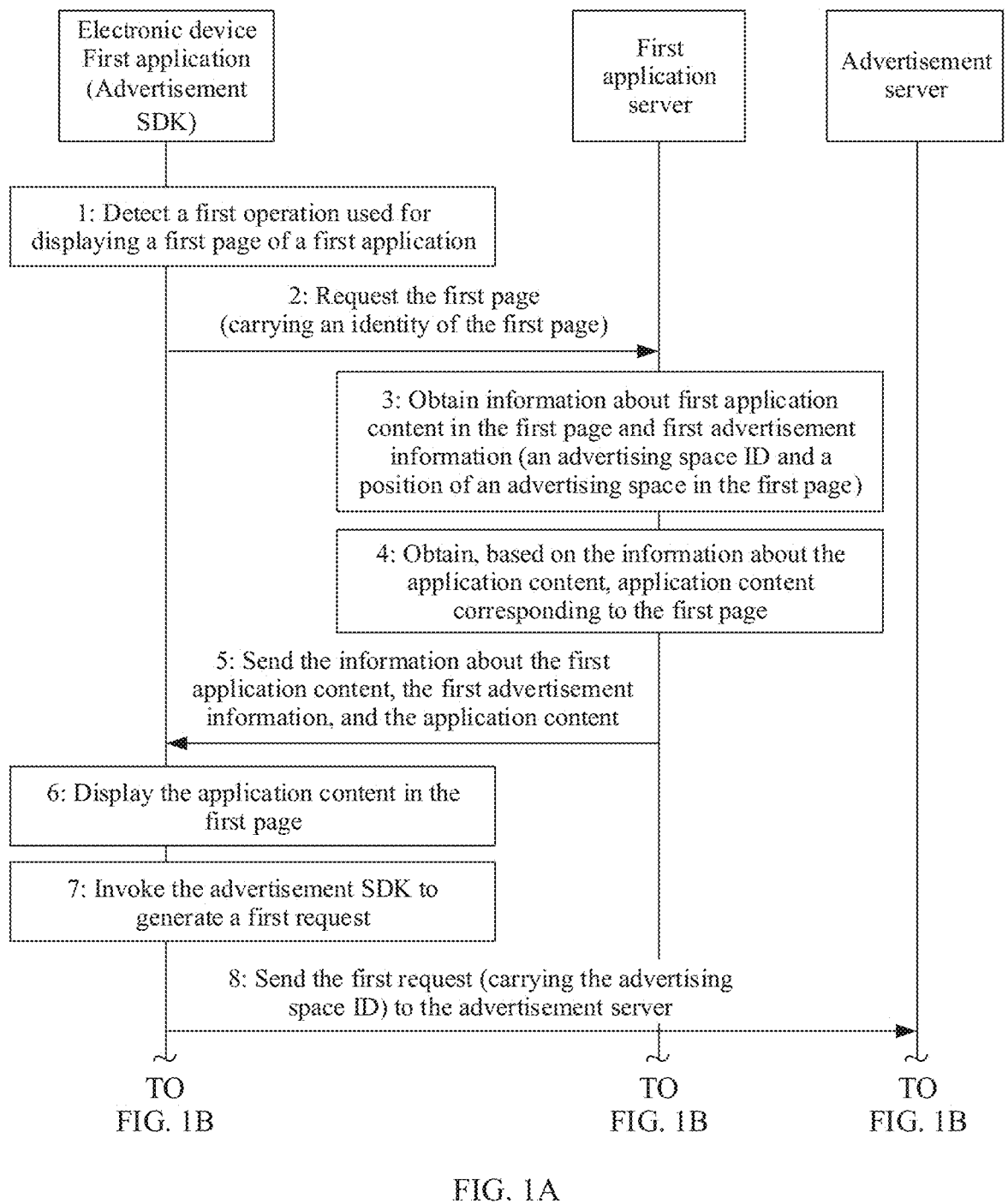
FIG. 1A and FIG. 1B are a schematic flowchart of an advertisement display method.

The following clearly describes the technical solutions in embodiments of this application in detail with reference to the accompanying drawings. In descriptions of embodiments of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of embodiments of this application, "a plurality of" means "two or more".

The terms "first" and "second" mentioned below are merely used for the purpose of description, and shall not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means "two or more".

The term "user interface (user interface, UI)" in the following embodiments of this application is a medium interface for interaction and information exchange between an application or an operating system and a user, and implements conversion between an internal form of information and a form acceptable to the user. A user interface is source code written in a specific computer language such as Java or an extensible markup language (extensible markup language, XML). Interface source code is parsed and rendered on an electronic device, and is finally presented as content that can be identified by the user. The user interface is usually represented in a form of a graphical user interface (graphical user interface. GUI), and is a user interface related to a computer operation and displayed in a form of a graph. The user interface may be a visual interface element such as a text, an icon, a button, a menu, a tab, a text box, a dialog box, a status bar, a navigation bar, or a widget that is displayed on a display of the electronic device.

Before this application is further described in detail, terms in embodiments of this application are first explained as follows:

Advertising: an activity in which an advertiser uses an application to spread information about a commodity or a service to users for purposes of improving awareness and brand image, promoting services, expanding product sales, and increasing service revenues.

Advertisement: composed of advertising elements. The advertising elements include but are not limited to a picture, a video, an audio, and a text.

Advertising space: used for displaying an advertisement. An advertising space is a region or a window in a page provided by an application. There may be the following types of advertising spaces: splash advertising spaces, in-app advertising spaces, interstitial advertising spaces, banner advertising spaces, and the like.

Advertising space ID: a unique identity of an advertising space in an application. An advertising space ID is obtained by a developer of an application through application to an advertising platform, and is integrated into the application when the developer develops the application. A correspondence between the advertising space ID and the application is stored in an advertisement server that provides an advertisement service for the application and stored in an application of an electronic device 100.

Some or all advertising elements of an advertisement displayed in an advertising space can be bound to a corresponding advertisement landing page. Different advertising elements may be bound to or correspond to a same advertisement landing page or different advertisement landing pages. After a user taps an advertising element in the advertising space, the electronic device may display an advertisement landing page bound to the advertising element. Another page connected to the advertisement landing page is also referred to as an advertisement landing page.

Advertisement landing page: also used for displaying an advertisement. An advertisement landing page may display an advertisement containing more abundant content than an advertisement displayed in an advertising space, and provide services for the user, such as commodity purchase, application installation, and a VR/AR service. An advertisement landing page is also referred to as an advertisement landing page, a promotion page, or a target page.

Conversion of an advertisement landing page: a specific behavior performed by a user in the advertisement landing page. Specifically, the specific behavior may include any one of the following: staying on the advertisement landing page beyond a specific time; browsing a specific page, such as a registration page, in the advertisement landing page: registering an account or submitting an order or personal data in the advertisement landing page: leaving a message on the advertisement landing page or consulting a service by using an online instant messaging tool; purchasing a commodity or a service in the advertisement landing page; downloading an application in the advertisement landing page; or the like.

Conversion rate of an advertisement landing page: a ratio of a quantity of conversion times of the advertisement landing page to a quantity of access times of the advertisement landing page. For example, if 100 users see an advertisement displayed in an advertising space in an application, 50 of the users tap the advertisement and jump to a corresponding advertisement landing page, and 20 of the 50 users perform conversion, the conversion rate of the advertisement landing page is (20/50)×100%=40%. A higher conversion rate of an advertisement landing page indicates that more users are interested in an advertisement in the advertisement landing page and that the promotion effect of a corresponding advertiser is higher.

Figure 1B:
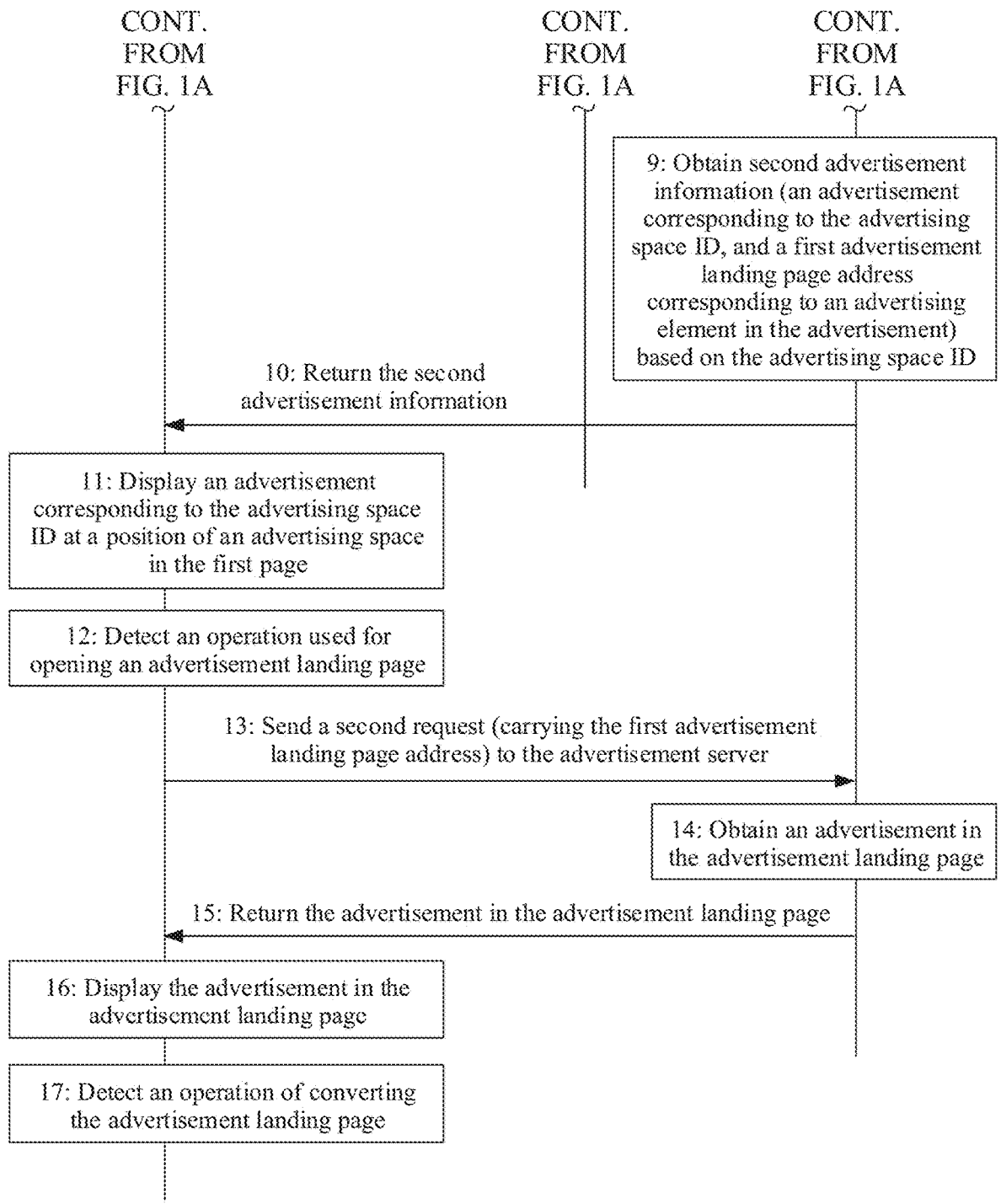

FIG. 1A and FIG. 1B show a procedure of an advertisement display method. In the method, display of an advertisement is implemented by integrating an advertisement software development kit (software development kit, SDK) into an application. A specific procedure of the method includes the following steps:

1: An electronic device detects a first operation used for displaying a first page of a first application.

Figure 2A:
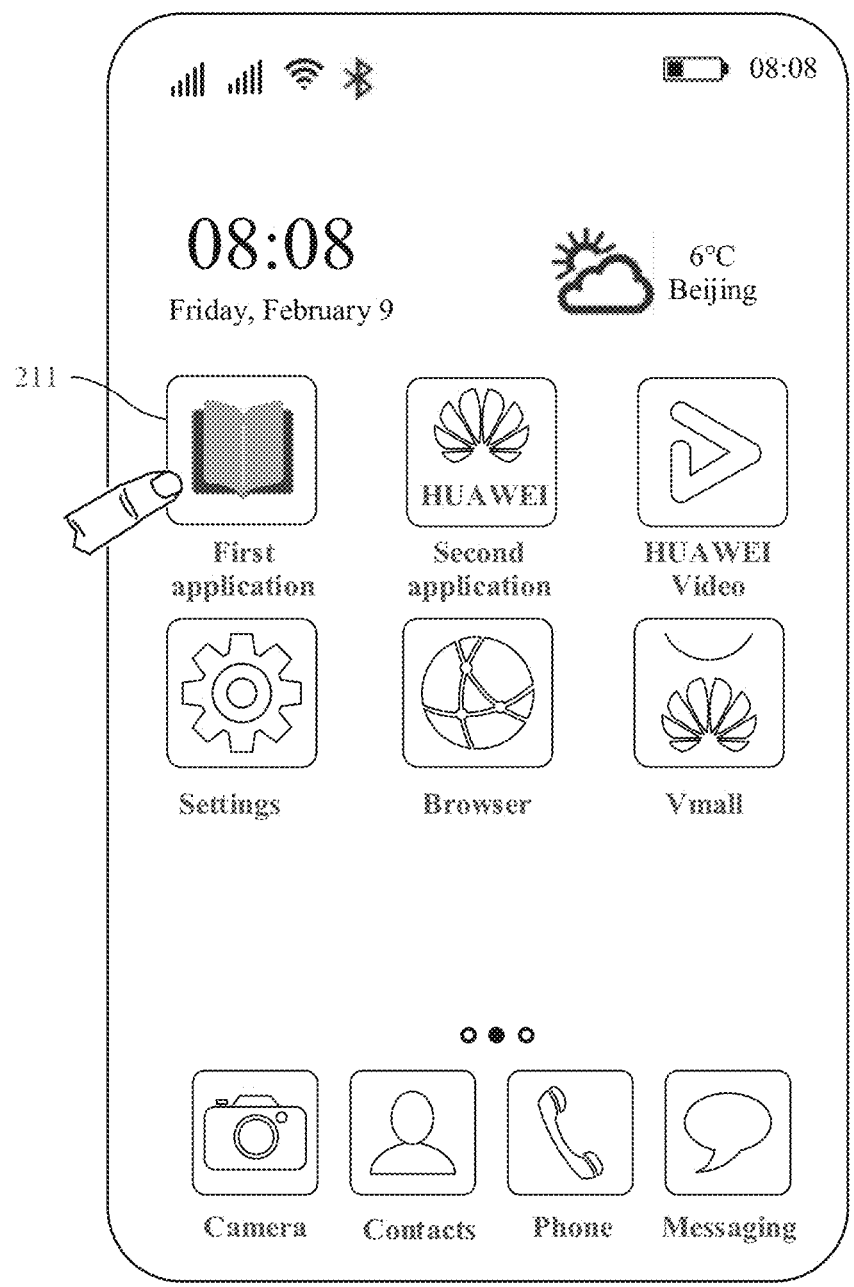
FIG. 2A to FIG. 2H are schematic diagrams of a group of user interfaces displaying advertisements.

For example, the first operation may be an operation of tapping a first application icon 211 in FIG. 2A by a user.

2: In response to the detected first operation, send a request for the first page of the first application to a first application server.

The electronic device 100 sends the request for the first page to the first application server in response to the first operation.

In this embodiment of this application, the request carries a page identity of the first page.

In some embodiments, when the electronic device 100 starts a first application and displays a splash advertisement in the first application, the first request carries an advertising space ID corresponding to the splash advertisement, and the advertising space ID is pre-stored in the first application.

3: The first application server obtains information about application content and first advertisement information in the first page based on the request of the electronic device.

The first application server pre-stores information about application content in each page of the first application and the first advertisement information. The information about the application content includes but is not limited to an application content ID and a position of the application content in the first page. The first advertisement information includes the advertising space ID and a position of an advertising space in the first page.

The first application server may obtain information about corresponding application content and the first advertisement information based on the page identity of the first page and in the request sent by the electronic device.

4: The first application server obtains corresponding application content based on the information about the application content in the first page.

The first application server pre-stores the application content in each page of the first application. The first application server may obtain the corresponding application content based on the application content ID in the information about the application content in the first page.

5: The first application server sends the information about the application content in the first page, the first advertisement information, and the application content to the electronic device.

6: The electronic device displays the application content at the position of the application content in the first page.

Figure 2B:
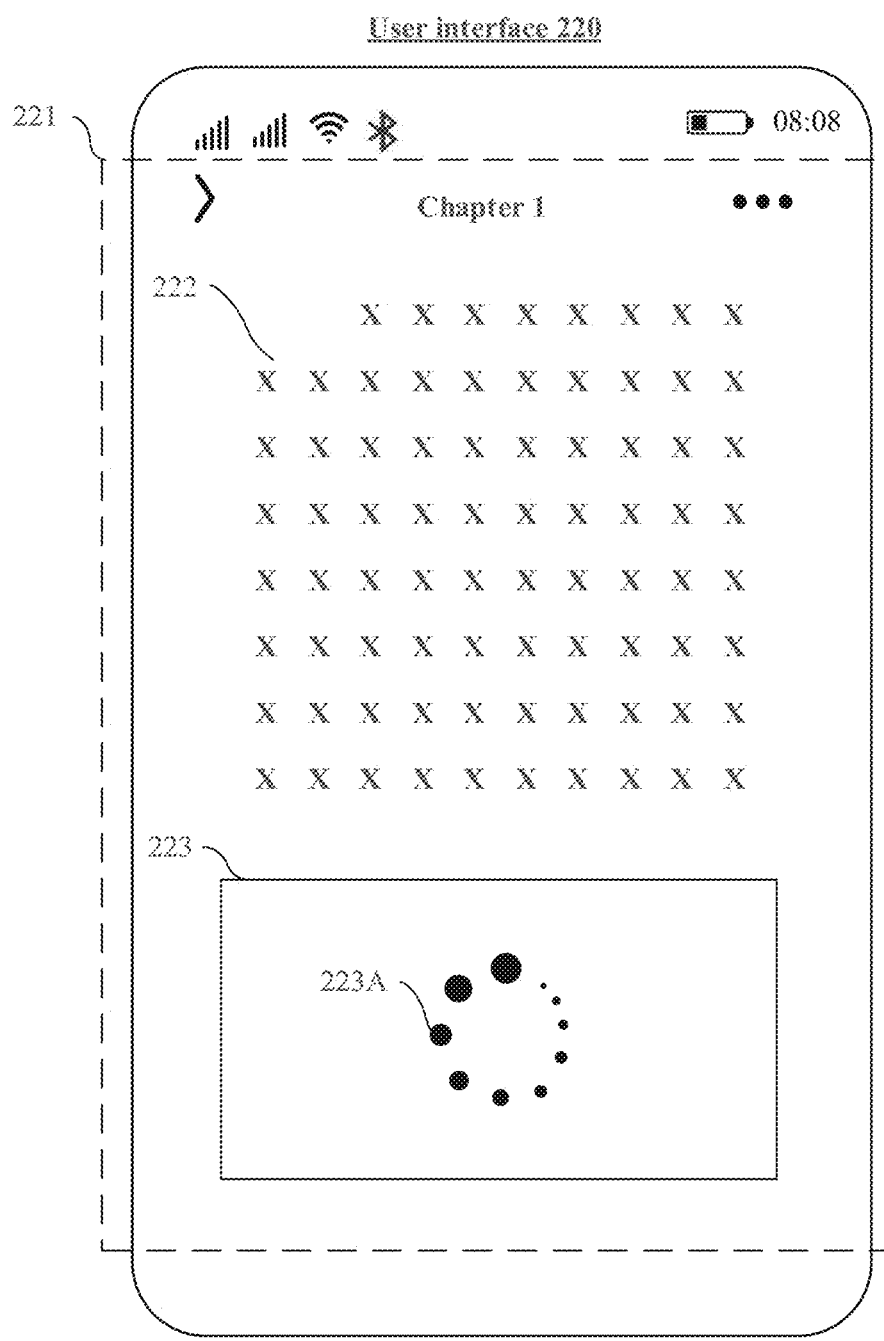

FIG. 2B illustrates a user interface 220 through which the electronic device displays the application content in the first application. The user interface 220 includes a first page 221. The first page 221 includes application content 222 and an advertising space 223.

The first page is a page provided by the first application, and does not include content, such as a status bar, a navigation bar, or a notification bar, provided by a system application of the electronic device.

Because the electronic device has not obtained, at that time, an advertisement displayed in the advertising space, a load icon 223A is displayed in the advertising space 223. The load icon 223A indicates that the advertisement displayed in the current advertising space 223 is being obtained.

7: The electronic device invokes the advertisement SDK to generate a first request.

In a possible implementation, the first application in the electronic device pre-stores the advertising space ID in the first page. After learning, based on advertisement information in the first page, that the first page includes the advertising space, the electronic device may determine the advertising space ID corresponding to the first page, and generate the first request, where the first request carries the advertising space ID.

In another possible implementation, the electronic device determines, based on an advertising space ID recorded in the advertisement information, the advertising space ID corresponding to the first page.

8: The electronic device sends the first request to an advertisement server, where the first request carries an advertising space ID.

9: The advertisement server obtains second advertisement information based on the advertising space ID.

The second advertisement information includes an advertisement corresponding to the advertising space ID, and a first advertisement landing page address corresponding to an advertising element in the advertisement.

The first advertisement landing page address herein is an advertisement landing page address defined in a first language. For the advertisement landing page address described in the first language, refer to the following detailed description in step S105. Details are not described herein.

10: The advertisement server sends the second advertisement information to the electronic device.

11: The electronic device displays an advertisement corresponding to the advertising space ID at a position of an advertising space in the first page.

Figure 2C:
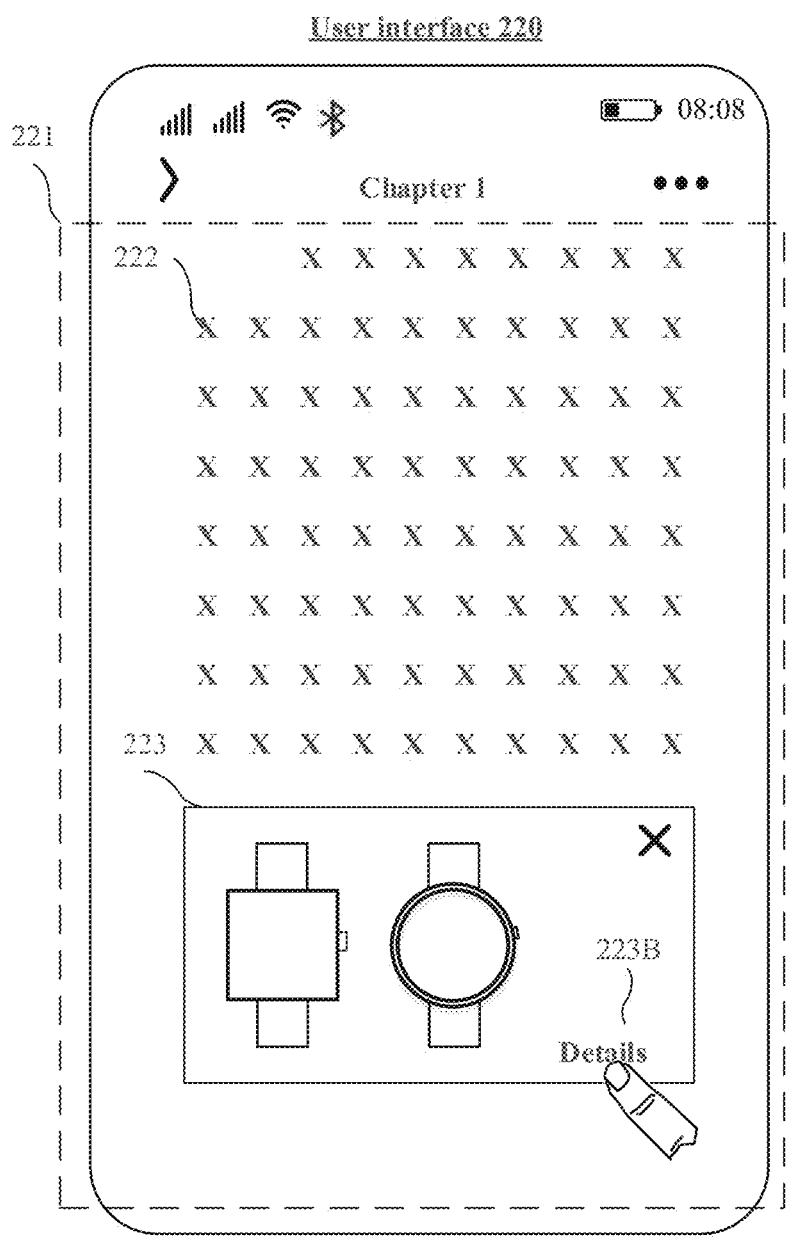

FIG. 2C illustrates a user interface 220 through which the electronic device displays the advertisement in the advertising space. The user interface 220 includes a first page 221. The first page 221 includes application content 222 and an advertising space 223. The advertisement is displayed in the advertising space 223. In this embodiment of this application, the user interface 220 is also referred to as a first interface.

12: The electronic device detects an operation used for opening an advertisement landing page.

The operation used for opening the advertisement landing page may be an operation of tapping an advertising element in the advertising space, for example, may be an operation of tapping 223B in FIG. 2C by the user. The foregoing operation used for opening the advertisement landing page is also referred to as a second operation.

13: The electronic device sends a second request to the advertisement server, where the second request carries a first advertisement landing page address.

In response to detecting the operation of tapping the advertising element in the advertising space, the electronic device requests, from the advertisement server based on the first advertisement landing page address corresponding to the advertising element, an advertisement in an advertisement landing page corresponding to the first advertisement landing page address.

14: The advertisement server obtains an advertisement in an advertisement landing page corresponding to the first advertisement landing page address.

15: The advertisement server sends the advertisement in the advertisement landing page to the electronic device.

16: The electronic device displays the advertisement in the advertisement landing page.

The electronic device may invoke the first application to display, in the advertisement landing page, the advertisement in the advertisement landing page, or invoke an advertisement SDK integrated into the first application to display, in the advertisement landing page, the advertisement in the advertisement landing page.

If the advertisement landing page is configured to provide a VR/AR service, and the first application is a third-party application, the advertisement SDK of the third-party application has no permission to use a system-level VR/AR engine of the electronic device. As a result, the advertisement SDK needs to install, with authorization of the user, a VR/AR engine that can provide a service for the third-party application; and to use the VR/AR engine to provide a VR/AR service in the advertisement landing page.

Figure 2D:
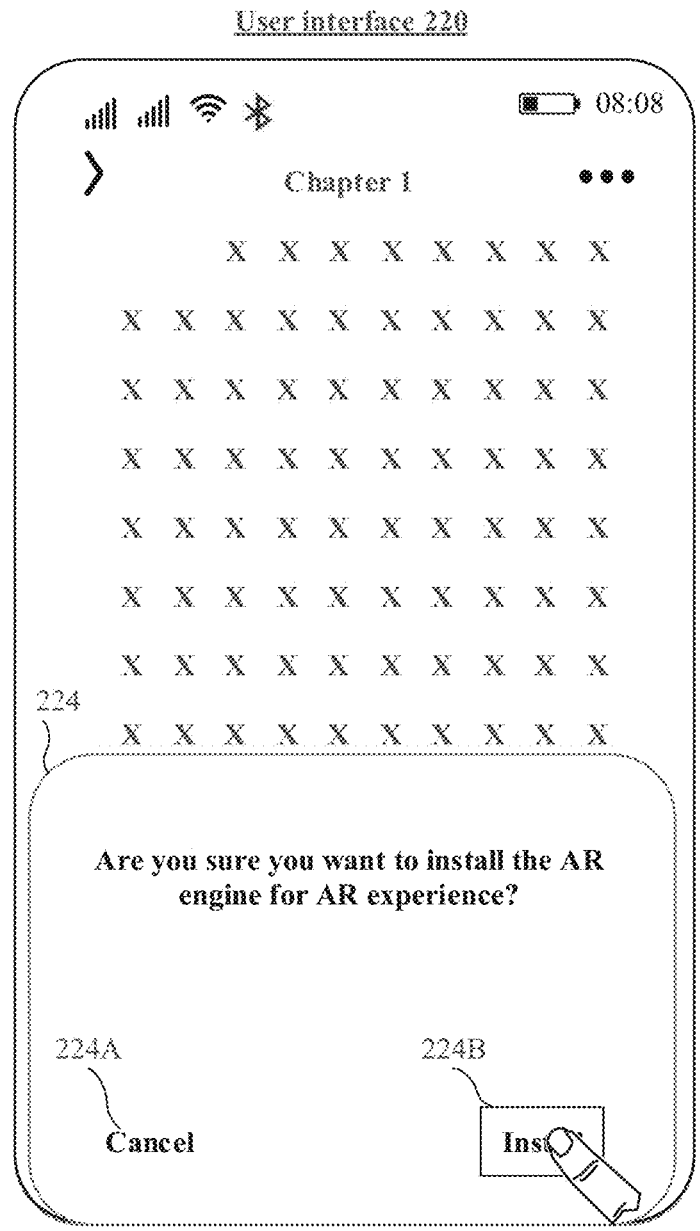
Figure 2E:
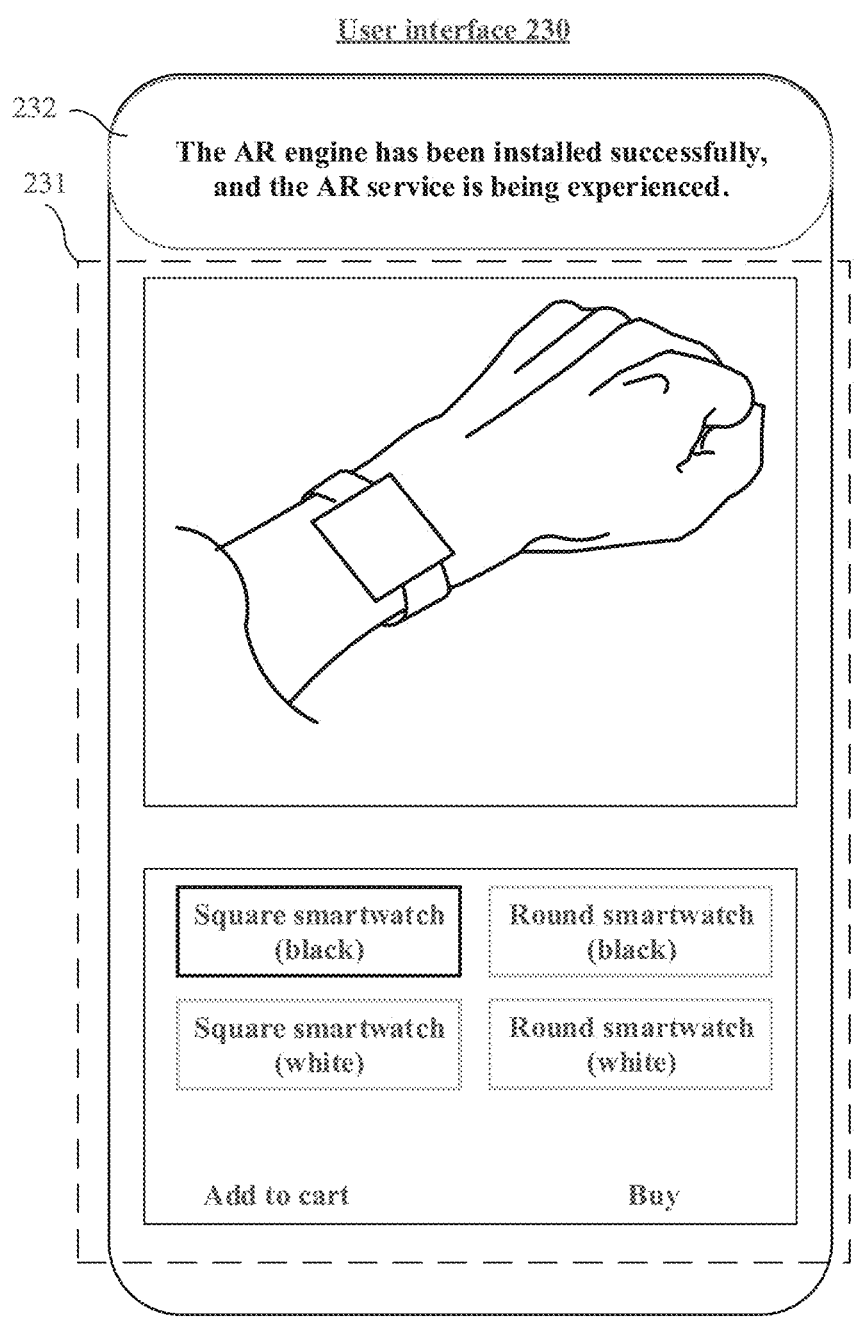

FIG. 2D and FIG. 2E illustrate a series of user interfaces through which the electronic device displays the advertisement landing page and provides an AR service in the advertisement landing page for the user.

Refer to FIG. 2D. The electronic device may display a window 224 in FIG. 2D in response to detecting the operation of tapping 223B in FIG. 2C.

As shown in FIG. 2D, the window 224 includes a control 224A and a control 224B. The window 224 is configured to prompt the user whether to install an AR engine, to experience the AR service in the advertisement landing page. The control 224A is configured to cancel installation of the AR engine and close the window 224. The control 224B is configured to install the AR engine, so that the user can experience the AR service in the advertisement landing page.

Refer to FIG. 2E. After the electronic device downloads and installs the AR engine in response to detecting an operation of tapping the control 224B in FIG. 2D by the user, the electronic device displays a user interface 230 in FIG. 2E. The operation, detected by the electronic device, of tapping the control 224B in FIG. 2D by the user is also referred to as a third operation.

As shown in FIG. 2E, the user interface 230 includes an advertisement landing page 231 and a window 232. The advertisement landing page 231 is provided by an application, and does not include the content, such as the status bar, the navigation bar, or the notification bar, provided by the system application of the electronic device. The window 232 is configured to prompt the user with "The AR engine has been installed successfully, and the AR service is being experienced".

In this embodiment of this application, the advertising element included in the advertisement landing page 231 is also referred to as a VR/AR material.

In this embodiment of this application, the user interface 230 is also referred to as a second interface.

17: The electronic device detects an operation of converting the advertisement landing page.

If the advertisement landing page is configured to provide a service of installing an application, the operation of converting the advertisement landing page is: After the user confirms installation of the application, the advertisement SDK of the electronic device needs to check the security level of the application. When it is checked that the security level of the application is relatively low, the electronic device needs to obtain the authorization of the user again before downloading and installing the application.

Figure 2F:
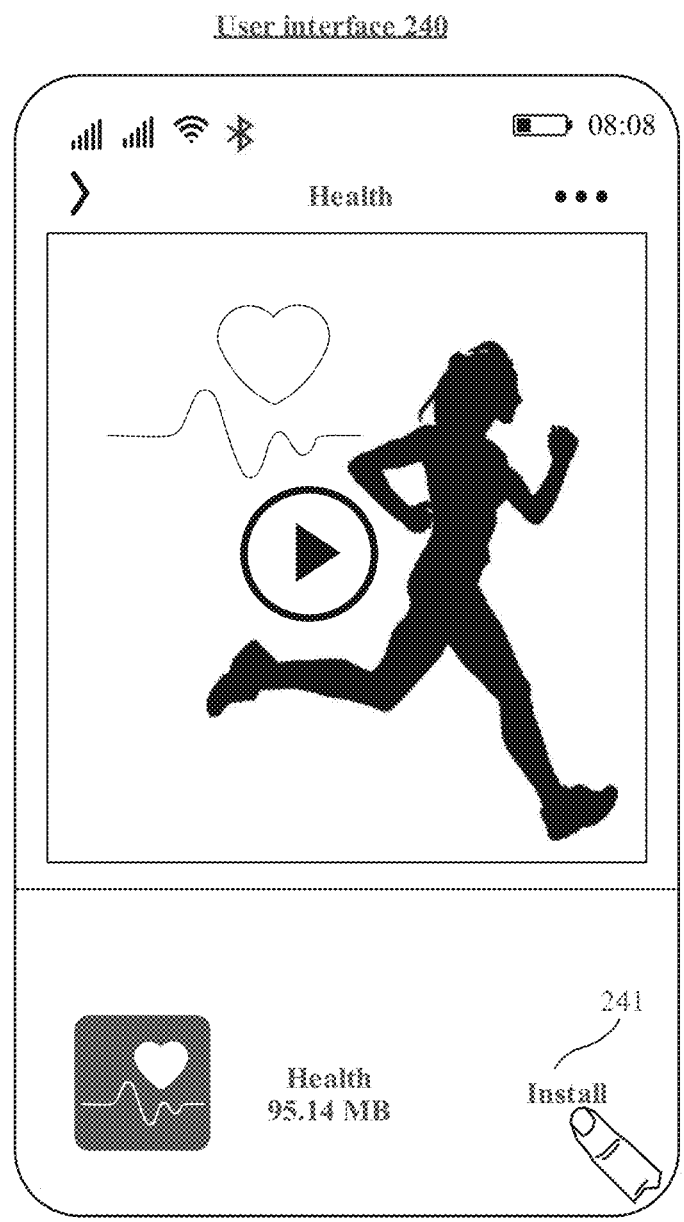
Figure 2G:
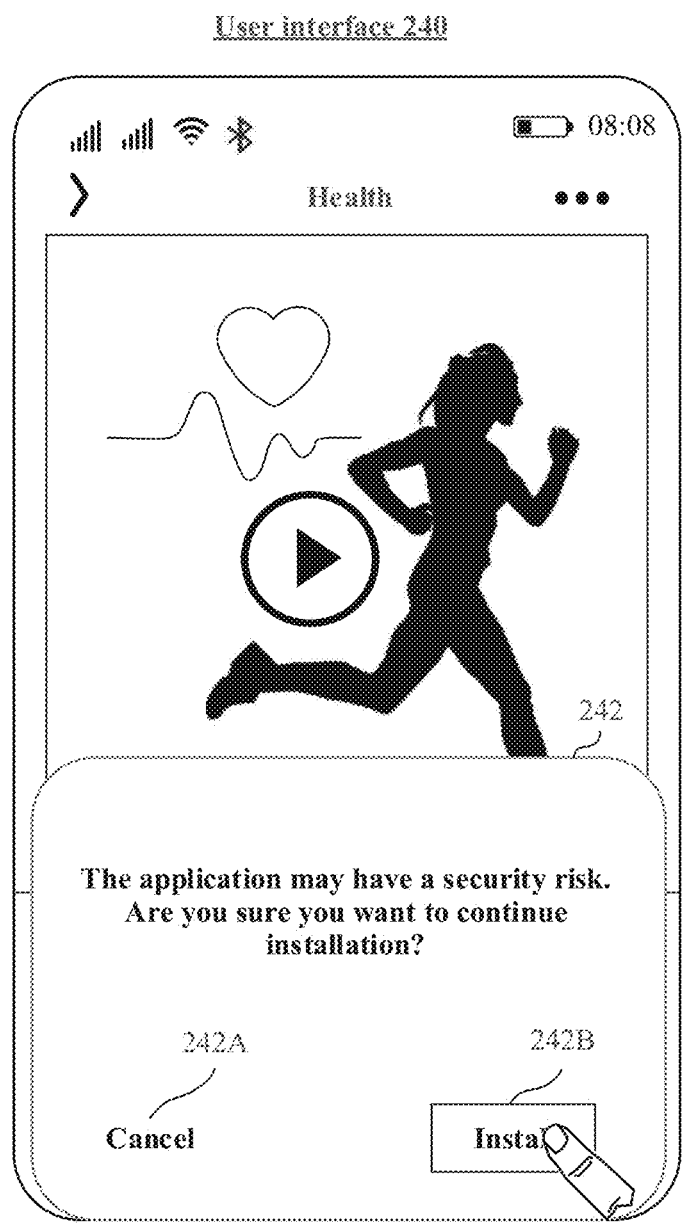
Figure 2H:
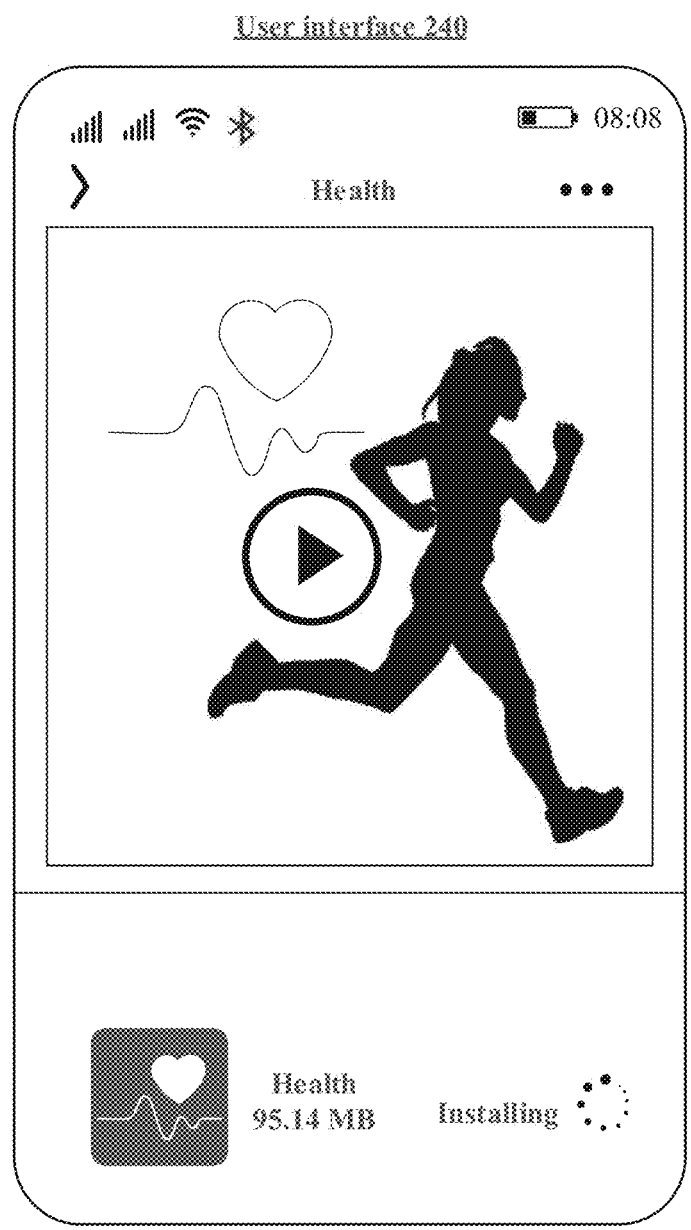

In response to detecting an operation used for displaying the advertisement landing page, for example, an operation, illustrated in FIG. 2C and detected by the electronic device 100, of tapping the advertising element "Details" 223B in the advertising space, the electronic device 100 displays a series of user interfaces that are shown in FIG. 2F to FIG. 2H and that provide an application installation service in the advertisement landing page for the user.

Refer to FIG. 2G. The electronic device may display a user interface 240 in FIG. 2G in response to detecting an operation of tapping 241 in FIG. 2F. The user interface 240 includes a window 242. The window 242 includes a control 242A and a control 242B. The window 242 is used to: remind the user that the application may have a security risk, and ask the user whether to continue installation. The control 242A is configured to reject the installation of the application. The control 242B is configured to continue the installation of the application. The user interface 240 is also referred to as a second interface. The operation of tapping 241 in FIG. 2F by the user is also referred to as a fourth operation.

Refer to FIG. 2H. The electronic device starts to install the application in response to the electronic device detecting an operation of tapping the control 242B in FIG. 2G by the user. The operation of tapping the control 242B in FIG. 2G by the user is also referred to as a fifth operation.

It can be learned that the advertisement display method shown in FIG. 1A and FIG. 1B has the following defects:

1. Refer to FIG. 2B. Because the electronic device can invoke, only after obtaining the application content, an advertisement SDK interface to obtain an advertisement in an advertising space, if a load time of the advertisement in the advertising space is relatively long, the user needs to wait for an excessively long time to see the advertisement in the advertising space. In this case, it is highly possible that the user slides through a page to skip the advertising space, which reduces a probability that the user watches the advertisement, taps the advertisement to enter a corresponding advertisement landing page, and performs a series of operations such as converting the advertisement landing page. As a result, a conversion rate of the advertisement landing page is reduced. This not only affects advertising experience of the user, but also wastes advertisement costs, and affects interests of an advertiser.
2. If the advertisement SDK is integrated into the application intrusively, a corresponding application installation package (Android package, APK) is too large. In addition, different applications need to integrate respective advertisement SDKs, and a same advertisement SDK cannot be shared by a plurality of applications.
3. If the advertisement landing page provides the VR/AR service, the electronic device needs to install, with the authorization of the user, the VR/AR engine that provides the service for the third-party application. In this way, the user needs to perform complex operations to experience the AR service in the advertisement landing page. This affects advertising experience of the user.

4. If the operation of converting the advertisement landing page is installing the application, after the user confirms the installation of the application, the electronic device needs to request, from the user again, permission to install the application; and the electronic device can start to download and install the application only after the user confirms the installation of the application again. In this way, operations are too complex, and the user may interrupt the operation of converting the advertisement landing page. This reduces the conversion rate of the advertisement landing page.

To resolve the foregoing problem, the following embodiments of this application provide an advertisement display method. In the method, after an electronic device requests a first page of a first application from a first application server in response to an operation of a user, the first application server obtains information about application content and first advertisement information (an advertising space ID and a position of an advertising space in the first page) in the first page: obtains corresponding application content based on the information about the application content; and obtains second advertisement information (an advertisement corresponding to the advertising space ID) from an advertisement server based on the advertising space ID in the first advertisement information. Then, the first application server sends the information about the application content in the first page, the first advertisement information, the obtained application content, and the second advertisement information to the electronic device; and the electronic device displays the application content in the first page, and displays, at the position of the advertising space, the advertisement corresponding to the advertising space ID. In this way, the electronic device is enabled to display, in the first page, both the application content and the advertisement corresponding to the advertising space ID, thereby improving advertisement display efficiency and improving advertising experience of the user.

In this embodiment of this application, the first application is any application installed in the electronic device, for example, a system application such as HUAWEI Video, Reader, Vmall, or HUAWEI Wallet, or a third-party application such as a social application, a shopping application, or an education application.

In this embodiment of this application, the first page is a page provided by the first application, and does not include content, such as a status bar, a navigation bar, or a notification bar, provided by a system application of the electronic device. Specifically, in the advertisement display method mentioned above, the second advertisement information obtained by the advertisement server may further include a second advertisement landing page address corresponding to each advertising element in the advertisement corresponding to the advertising space ID. After displaying the advertisement in the advertising space in the first page, the electronic device may obtain, in response to a detected operation used for displaying an advertisement landing page, an advertisement in a corresponding advertisement landing page based on the second advertisement landing page address, and display the advertisement landing page.

The second advertisement landing page address is an advertisement landing page address defined in a second language. For the advertisement landing page address defined in the second language, refer to the following detailed description in step S105. Details are not described herein.

In some embodiments, the electronic device is integrated with a system-level advertisement service kit (advertisement service kit, Adskit). The Adskit is a system module, and may provide an advertisement service for all applications in the electronic device. Specifically, the Adskit may obtain the second advertisement landing page address sent by the advertisement server through the first application server, obtain the corresponding advertisement landing page based on the second advertisement landing page address, and then display the advertisement landing page on a display of the electronic device.

In this way, the Adskit can be shared by applications in the electronic device. Not all the applications need to integrate advertisement SDKs. Therefore, a size of an application APK is reduced.

In some embodiments, the Adskit may be invisible to a user.

In some embodiments, the electronic device is further integrated with a system-level VR/AR engine. The system-level VR/AR engine may be invoked by an application (for example, a system-level application) or a system module (for example, an Adskit) in the electronic device. For example, when the advertisement landing page is configured to provide a VR/AR service, the Adskit may directly invoke the system-level VR/AR engine, and provide the VR/AR service in the advertisement landing page by using the VR/AR engine.

In this way, a user can experience a VR/AR service in the advertisement landing page without needing to install a VR/AR engine invoked by a third-party application, so that operations of the user are simplified. Therefore, advertising experience of the user is improved, and then, conversion efficiency of the advertisement landing page is improved.

The VR/AR service enables the user to experience a VR/AR technology in the advertisement landing page of the electronic device. Specifically, a VR technology is generating a virtual scenario in which virtual and reality are combined by using a computer, so that the user is immersed in the virtual scenario. The virtual scenario may be a picture or a video. The video may be a video generated in a one-shot manner, or may be a video generated after cutting. An AR technology is a technology in which information about a real environment and information about a virtual object can be simultaneously displayed in a same scenario after being fused. The scenario may be a picture or a video. The video may be a video generated in a one-shot manner, or may be a video generated after cutting.

In this embodiment of this application, providing the VR/AR service in the advertisement landing page is an advertisement service for displaying the advertisement landing page by using a VR/AR technology. For example, as shown in FIG. 5D and FIG. 5E in the following, the AR technology is used to: combine a virtual commodity image and a real human body image, and then provide, for the user based on different commodity information selected by the user, a service of trying on a commodity online. The VR/AR service provided in the advertisement landing page is not limited to UI embodiments shown in FIG. 5D and FIG. 5E, and may be in another form. For example, the advertisement landing page may further use the VR technology to promote a product (a house to be sold) or a service (online travel), and the like. In this case, when watching the advertisement landing page, the user may experience virtual experience of watching a house on site, or a virtual service of traveling on site.

In some embodiments, the electronic device may further store a whitelist. The whitelist includes a plurality of preset applications with relatively high security levels. The security level of an application may be considered in multiple dimensions. For example, a larger permission range of the application indicates a lower security level, or a specific category (for example, an education and learning category) or the like of the application indicates a higher security level. This is not limited herein. The whitelist may be obtained by the electronic device from the advertisement server, or may be obtained from a vendor of the electronic device, or may be preset in the electronic device.

When the advertisement landing page displayed by the electronic device is configured to provide an installation service of an application, after the user confirms installation of the application in the advertisement landing page, the system-level Adskit in the electronic device may directly check whether the application is in the whitelist. If yes, the electronic device may directly download and install the application without obtaining authorization of the user again.

In this way, the user can implement the installation of the application by performing only one operation of confirming the installation of the application. This not only ensures security of the application, but also reduces repeated operations of confirming the installation of the application, thereby improving advertising experience of the user, and then improving conversion efficiency of the advertisement landing page.

To describe the advertisement display method provided in the embodiments of this application more clearly and in detail, a communication system 10 in embodiments of this application is described below first. The method provided in the embodiments of this application may be applied to the communication system 10 shown in FIG. 3A.

Figure 3A:
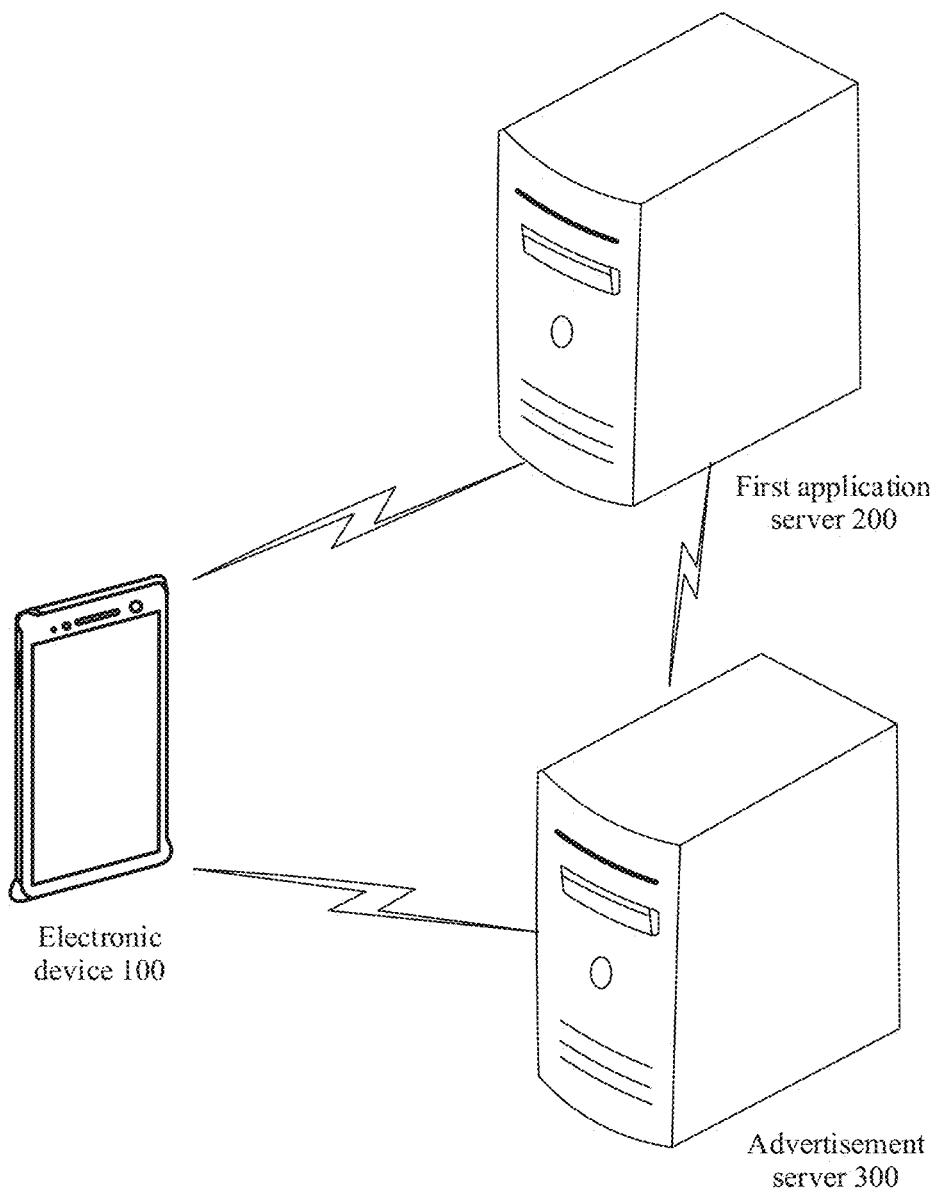
FIG. 3A is a schematic diagram of a communication system according to an embodiment of this application.

Refer to FIG. 3A. The communication system 10 includes an electronic device 100, a first application server 200, and an advertisement server 300.

A first application and the like are installed in the electronic device 100. The first application may display an advertisement in an advertising space while displaying application content. Specifically, the electronic device 100 may request, from the first application server 200 in response to an operation of a user, a first page provided by the first application. The first application server 200 obtains information about first application content and first advertisement information (an advertising space ID and a position of an advertising space in the first page) in the first page; obtains corresponding application content based on an application content ID in the information about the application content; and obtains a corresponding advertisement from the advertisement server 300 based on the advertising space ID in the first advertisement information. Then, the electronic device 100 may receive the information of the application content in the first page, the first advertisement information, the application content, and the advertisement that are sent by the first application server 200; display the application content at the position of the application content in the first page; and display the advertisement at the position of the advertising space.

In some embodiments, an Adskit may also be installed in the electronic device 100. The Adskit may display an advertisement landing page. Specifically, in response to an operation of tapping an advertisement in the advertising space in the first page, the electronic device 100 may obtain, by using the Adskit, an advertisement landing page address sent by the advertisement server 300 through the first application server 200: obtain a corresponding advertisement landing page based on the address; and then, display the advertisement landing page on a display of the electronic device.

The Adskit may be in a system service of the electronic device 100, for example, Huawei mobile services (Huawei mobile services, HMS).

In some embodiments, a VR/AR engine may also be installed in the electronic device 100. The VR/AR engine may be invoked by the electronic device 100, and provide a VR/AR service for the user in the advertisement landing page provided by the Adskit.

The VR/AR engine may be in a system service of the electronic device 100, for example, Huawei mobile services HMS.

The first application server 200 may store information about application content in each page of the first application, the first advertisement information (the advertising space ID and the position of the advertising space in the first page), and the application content; and is configured to provide a service for the first application in the electronic device 100. For example, the first application server 200 may search for the information about the application content and the first advertisement information in the first page based on a first page request sent by the electronic device 100: then, obtain corresponding application content based on the application content ID in the information about the application content; obtain the advertisement corresponding to the advertising space ID from the advertisement server 300 based on the advertising space ID in the first advertisement information; and finally, send the information about the application content in the first page, the first advertisement information, the application content, and the advertisement to the electronic device 100.

In this embodiment of this application, the first application server 200 is also referred to as a first server.

The advertisement server 300 may store an advertisement corresponding to an advertising space ID of the first application in the electronic device 100; and is configured to provide an advertisement service for the electronic device 100. For example, the advertisement server 300 may provide an application programming interface (application programming interface, API), so that the first application server 200 requests, through the API for the first application in the electronic device 100, an advertisement corresponding to an advertising space ID in the first page. The advertisement server 300 finds, based on the request, the advertisement corresponding to the advertising space ID in the first page, and then sends the advertisement to the electronic device 100 through the first application server 200.

There are a plurality of correspondences between advertising space IDs and advertisements. One advertising space ID may correspond to one or more advertisements. When one advertising space ID corresponds to a plurality of advertisements, the correspondence may be, for example, that one advertising space ID corresponds to a series of advertisements that are of a same type. In other words, one advertising space ID may correspond to a plurality of advertisements for cosmetics, another advertising space ID may correspond to a plurality of advertisements for electric appliances, and so on.

In some embodiments, the advertisement server 300 may further store an advertisement landing page address (the first advertisement landing page address) defined in a first language, an address translation rule, and advertisements in advertisement landing pages that correspond to advertising elements of the advertisement corresponding to the advertising space ID. The address translation rule is an address translation rule that is pre-agreed upon by the advertisement server 300 and the Adskit of the electronic device 100. The advertisement server 300 may translate, according to the address translation rule, the first advertisement landing page address into a second advertisement landing page address that can be identified by the Adskit.

The advertisement server 300 may send the second advertisement landing page address to the electronic device 100 through the first application server 200. The advertisement server 300 may further provide an advertisement information query interface for the Adskit of the electronic device 100. Specifically, when the Adskit responds to a detected operation used for opening an advertisement landing page, the Adskit may request, from the advertisement server through the advertisement information query interface, an advertisement in an advertisement landing page corresponding to the second advertisement landing page address. The advertisement server 300 may send the advertisement in the advertisement landing page to the electronic device 100 based on the request.

A software structure and a hardware structure of the electronic device 100 in embodiments of this application are described below first.

Figure 3B:
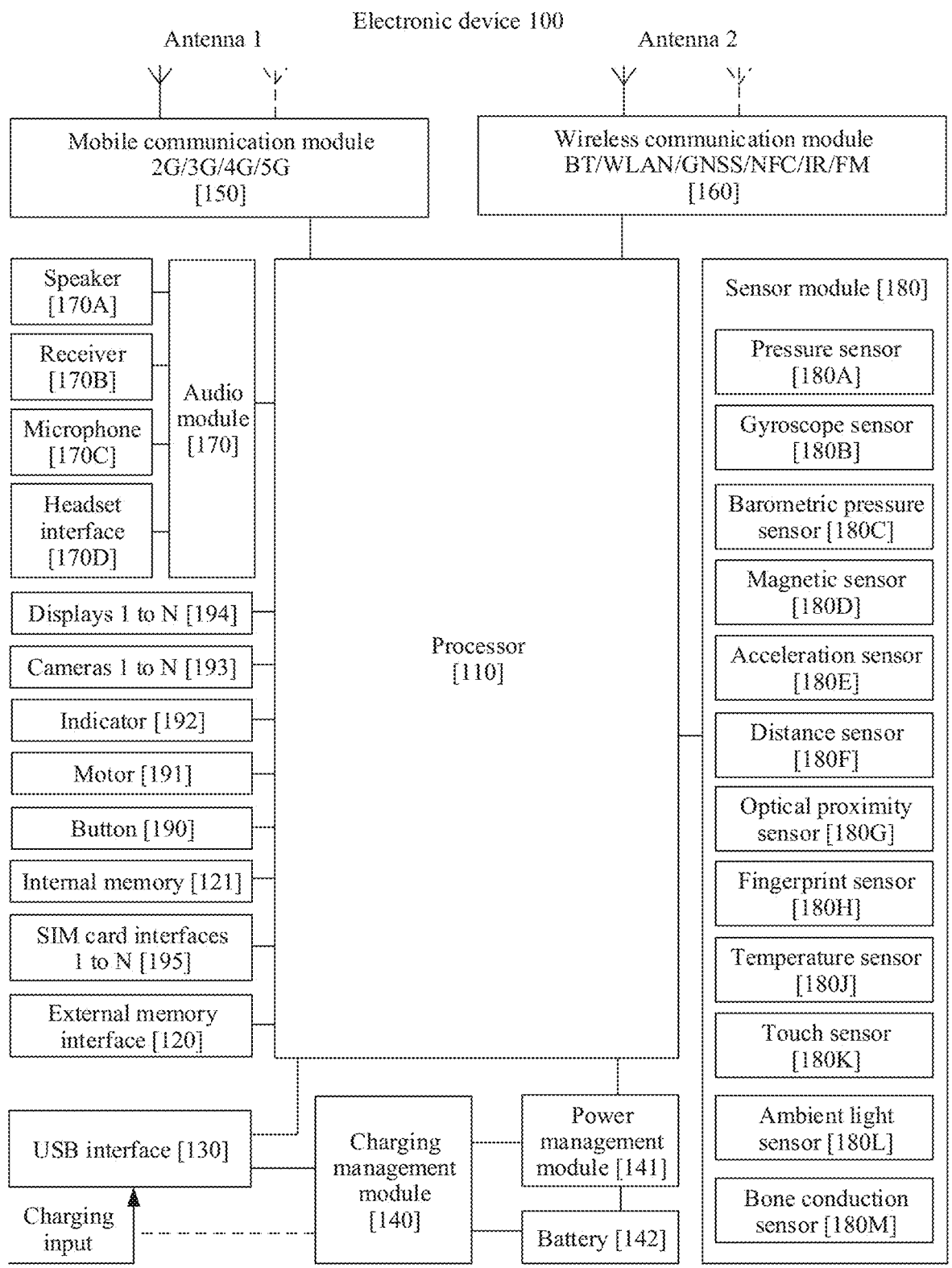
FIG. 3B is a schematic diagram of a hardware structure of an electronic device according to an embodiment of this application.

FIG. 3B is a schematic diagram of the hardware structure of the electronic device 100.

The electronic device may be a portable terminal device with iOS, Android®, Microsoft®, or another operating system, for example, a mobile phone, a tablet computer, or a wearable device: or may be a non-portable terminal device, for example, a laptop computer (Laptop) with a touch-sensitive surface or a touch panel, or a desktop computer with a touch-sensitive surface or a touch panel.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset interface 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 1803, a touch sensor 180K, an ambient light sensor 180L, a bone conduction sensor 180M, and the like.

It may be understood that the structure illustrated in this embodiment of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction reading and instruction execution.

In this embodiment of this application, the processor 100 may start the first application in response to the operation entered by the user, and instruct the display to display the first page provided by the first application. Then, the processor 100 may start the Adskit in response to the operation entered by the user, and instruct the display to display the advertisement landing page. For details, refer to detailed descriptions in subsequent method embodiments of this application. Details are not described herein.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a solution applied to the electronic device 100 for wireless communication such as 2G/3G/4G/5G. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert, through the antenna 1, an amplified signal into an electromagnetic wave for radiation. In some embodiments, at least some functional modules of the mobile communication module 150 may be disposed in the processor 110. In some embodiments, at least some functional modules of the mobile communication module 150 may be disposed in the same device as at least some modules of the processor 110.

The wireless communication module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communication module 160 may be one or more components integrating at least one communication processor module. The wireless communication module 160 receives an electromagnetic wave through the antenna 2, performs demodulation and filtering on an electromagnetic wave signal, and sends a processed signal to the processor 110. The wireless communication module 160 may further receive a to-be-sent signal from the processor 110, perform frequency modulation and amplification on the signal, and convert, through the antenna 2, a frequency-modulated and amplified signal into an electromagnetic wave for radiation.

In some embodiments, the antenna 1 and the mobile communication module 150 in the electronic device 100 are coupled, and the antenna 2 and the wireless communication module 160 in the electronic device 100 are coupled, so that the electronic device 100 can communicate with a network and another device by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access. TD-SCDMA), long term evolution (long term evolution, LTE), BT, GNSS, WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

In this embodiment of this application, the electronic device 100 may request, from the first application server 200 by using the mobile communication module 150 or the wireless communication module 160, the information about the first application content and the first advertisement information (the advertising space ID and the position of the advertising space in the first page) in the first page.

In some embodiments, the electronic device 100 may directly request, from the advertisement server by using the mobile communication module 150 or the wireless communication module 160, the advertisement landing page corresponding to the advertisement corresponding to the advertising space ID in the first page.

In some embodiments, the electronic device 100 may download a whitelist from the advertisement server 300 by using the mobile communication module 150 or the wireless communication module 160. The whitelist includes a plurality of preset applications with relatively high security levels.

The electronic device 100 may implement a display function by using the GPU, the display 194, the application processor, and the like. The GPU is a microprocessor for image processing, and is connected to the display 194 and the application processor. The GPU is configured to perform mathematical and geometric computation for graphics rendering. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the electronic device 100 may include one or N displays 194, where N is a positive integer greater than 1.

In this embodiment of this application, the display 194 may be configured to display the first page provided by the first application and the advertisement landing page provided by the Adskit. For content displayed on the display 194, refer to related descriptions in a subsequent UI embodiment. Details are not described herein.

The internal memory 121 may include one or more random access memories (random access memories, RAMs) and one or more non-volatile memories (non-volatile memories, NVMs).

The random access memory may include a static random access memory (static random access memory, SRAM), a dynamic random access memory (dynamic random access memory, DRAM), a synchronous dynamic random access memory (synchronous dynamic random access memory, SDRAM), a double data rate synchronous dynamic random access memory (double data rate synchronous dynamic random access memory, DDR SDRAM, for example, a 5th generation DDR SDRAM that is usually referred to as a DDR5 SDRAM), and the like.

The non-volatile memory may include a magnetic disk storage device and a flash memory (flash memory).

The random access memory may be directly read and written by the processor 110, may be configured to store an operating system or an executable program (for example, a machine instruction) of another running program, and may be further configured to store data of a user and an application, and the like.

The non-volatile memory may also store an executable program, data of a user and an application, and the like, which may be loaded into the random access memory in advance for directly reading and writing by the processor 110.

The external memory interface 120 may be configured to connect to an external non-volatile memory, to extend a storage capability of the electronic device 100. The external non-volatile memory communicates with the processor 110 through the external memory interface 120, to implement a data storage function. For example, files such as music and videos are stored in the external non-volatile memory.

In this embodiment of this application, the internal memory 121 or the external memory may be configured to store the whitelist. The whitelist includes a plurality of preset applications with relatively high security levels. The whitelist may be obtained by the electronic device 100 from the advertisement server 300, or may be obtained from a vendor of the electronic device 100, or may be preset in the electronic device 100.

The electronic device 100 may use the audio module 170, the speaker 170A, the receiver 170B, the microphone 170C, the headset interface 170D, the application processor, and the like to implement an audio function, for example, music playing and recording.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some functional modules of the audio module 170 may be disposed in the processor 110.

In this embodiment of this application, the electronic device 100 may listen to audio media or an advertisement by using the audio module 170.

The touch sensor 180K is also referred to as a "touch panel". The touch sensor 180K may be disposed in the display 194, so that the touch sensor 180K and the display 194 constitute a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may alternatively be disposed on a surface of the electronic device 100 at a position different from that of the display 194.

In this embodiment of this application, the touch sensor 180K may be configured to detect a touch operation of a user, for example, detect a touch operation used for starting an application or displaying an advertisement landing page. A software system of the electronic device 100 may use a layered architecture, an event-driven architecture, a micro-kernel architecture, a micro service architecture, or a cloud architecture. In an embodiment of this application, an Android® system of a layered architecture is used as an example to illustrate a software structure of the electronic device 100.

Figure 3C:
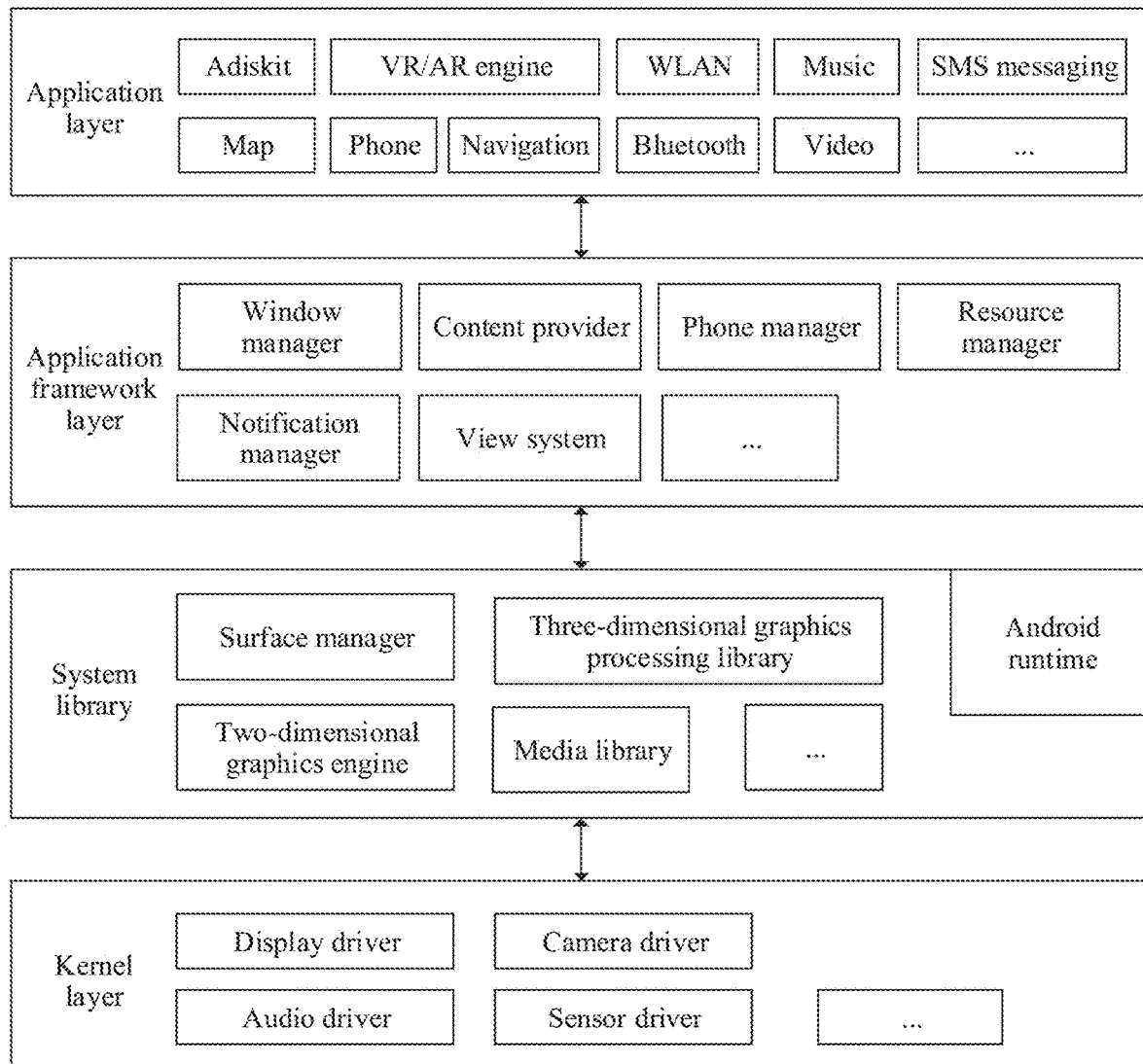
FIG. 3C is a schematic diagram of a software structure of an electronic device according to an embodiment of this application.

FIG. 3C is a block diagram of a software structure of the electronic device 100 according to an embodiment of this application.

In a layered architecture, software is divided into several layers, and each layer has a clear role and responsibility. The layers communicate with each other through a software interface. In some embodiments, the Android® system is divided into four layers: an application layer, an application framework layer, an Android® runtime (Android® runtime) and system library, and a kernel layer from top to bottom.

The application layer may include a series of application packages.

As shown in FIG. 3C, the application packages may include applications such as Adskit, VR/AR engine, WLAN. Music, SMS messaging, Map, Phone, Navigation, Bluetooth, and Video.

The application framework layer provides an application programming interface (application programming interface, API) and a programming framework for an application at the application layer. The application framework layer includes some predefined functions.

As shown in FIG. 3C, the application framework layer may include a window manager, a content provider, a view system, a phone manager, a resource manager, a notification manager, and the like.

The window manager is configured to manage a window program. The window manager may obtain a size of the display, determine whether there is a status bar, lock a screen, take a screenshot, and the like.

The content provider is configured to: store and obtain data, and enable the data to be accessible to an application. The data may include a video, an image, audio, calls that are made and answered, browsing history and favorites, a phone book, and the like.

The view system includes visual controls such as a control for displaying a text and a control for displaying an image. The view system may be configured to construct an application. A display interface may include one or more views.

For example, a display interface including an SMS notification icon may include a text display view and a picture display view.

The phone manager is configured to provide a communication function of the electronic device 100, for example, management of a call status (including answering, declining, or the like).

The resource manager provides, for an application, various resources such as a localized character string, an icon, a picture, a layout file, and a video file.

The notification manager starts an application to display notification information in a status bar, and may be configured to convey a notification-type message. The displayed information may automatically disappear after a short stay, without user interaction. For example, the notification manager is configured to notify a user that downloading is completed, provide a message notification, and the like. The notification manager may alternatively provide a notification that appears in a top status bar of the system in a form of a graph or a scroll bar text, for example, a notification of an application that is run on a background, or may provide a notification that appears on the screen in a form of a dialog window. For example, text information is displayed in the status bar, a prompt sound is given, the electronic device vibrates, or the indicator light blinks.

The Android® Runtime includes a kernel library and a virtual machine. The Android® runtime is responsible for scheduling and managing the Android® system.

The kernel library includes two parts: a function that needs to be called in Java language, and a kernel library of Android.

The application layer and the application framework layer run on the virtual machine. The virtual machine executes Java files of the application layer and the application framework layer as binary files. The virtual machine is configured to perform functions such as object lifecycle management, stack management, thread management, security and exception management, and garbage collection.

The system library may include a plurality of functional modules, for example, a surface manager (surface manager), a media library (Media Library), a three-dimensional graphics processing library (for example, OpenGL ES), and a 2D graphics engine (for example, SGL).

The surface manager is configured to manage a display subsystem, and provide fusion of 2D and 3D graphics layers for a plurality of applications.

The media library supports playback and recording in a plurality of common audio and video formats, a static image file, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, graphics layer processing, and the like.

The 2D graphics engine is a drawing engine for 2D drawing.

The kernel layer is a layer between hardware and software. The kernel layer includes at least a display driver, a camera driver, an audio driver, and a sensor driver.

Figure 3D:
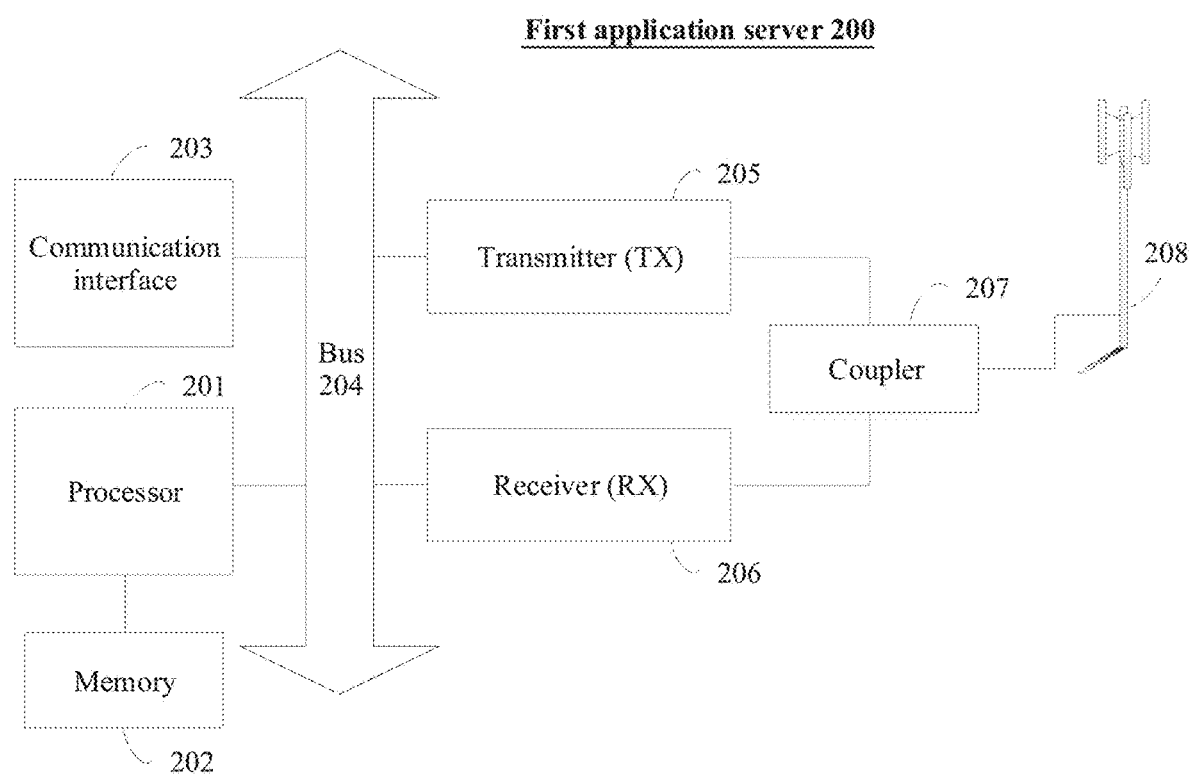
FIG. 3D is a schematic diagram of a structure of a first application server according to an embodiment of this application.

FIG. 3D illustrates a structure of the first application server 200 according to an embodiment of this application.

As shown in FIG. 3D, the first application server 200 may include one or more processors 201, a memory 202, a communication interface 203, a transmitter 205, a receiver 206, a coupler 207, and an antenna 208. These components may be connected by using a bus 204 or in another manner. In FIG. 3D, that the components are connected by using the bus is used as an example.

In this embodiment of this application, the processor 201 may be configured to read and execute computer-readable instructions. Specifically, the processor 201 may be configured to invoke a program stored in the memory 202, for example, a program that is provided in this embodiment of this application and that implements the following method on the side of the advertisement server 200: Search, based on a request of the electronic device 100 for a first page, for information about corresponding application content and first advertisement information (an advertising space ID and a position of an advertising space in the first page): send the information and the first advertisement information to the electronic device 100; and execute instructions included in the program.

The memory 202 is coupled to the processor 201, and is configured to store various software programs and/or a plurality of groups of instructions. Specifically, the memory 202 may include a high-speed random access memory, or a non-volatile memory, for example, one or more disk storage devices, a flash memory device, or another non-volatile solid-state storage device.

The memory 202 may store an operating system (briefly referred to as a system below), for example, an embedded operating system such as uCOS, VxWorks, or RTLinux. The memory 202 may further store a network communication program, where the network communication program may be used to communicate with the electronic device 100 and the advertisement server 300.

In this embodiment of this application, the memory 202 may further store information about application content corresponding to a page of a first application in the electronic device 100 and the first advertisement information (the advertising space ID and the position of the advertising space in the first page).

The communication interface 203 may be configured for the first application server 200 to communicate with another communication device, for example, the electronic device 100 or the advertisement server 300. Specifically, the communication interface 203 may be a 3G communication interface, a Long Term Evolution (LTE) (4G) communication interface, a 5G communication interface, a WLAN communication interface, a WAN communication interface, or the like. In addition to a wireless communication interface, a network device 300 may be further provided with a wired communication interface 203 to support wired communication. For example, a backhaul link between the first application server 200 and the advertisement server 300 may be a wired communication connection. In some embodiments of this application, the transmitter 205 and the receiver 206 may be considered as a wireless modem. The transmitter 205 may be configured to perform transmission processing on a signal output by the processor 201. The receiver 206 is configured to receive a signal. In the first application server 200, there may be one or more transmitters 205 and one or more receivers 206. The antenna 208 may be configured to: convert electromagnetic energy in a transmission line into an electromagnetic wave in free space, or convert an electromagnetic wave in the free space into electromagnetic energy in the transmission line. The coupler 207 may be configured to split a mobile communication signal into a plurality of signals, and distribute the plurality of signals to a plurality of receivers 206. It may be understood that the antenna 208 of the network device may be implemented as a large-scale antenna array.

It should be noted that the first application server 200 shown in FIG. 3D is merely an implementation of this embodiment of this application. In actual application, the first application server 200 may further include more or fewer components. This is not limited herein.

Figure 3E:
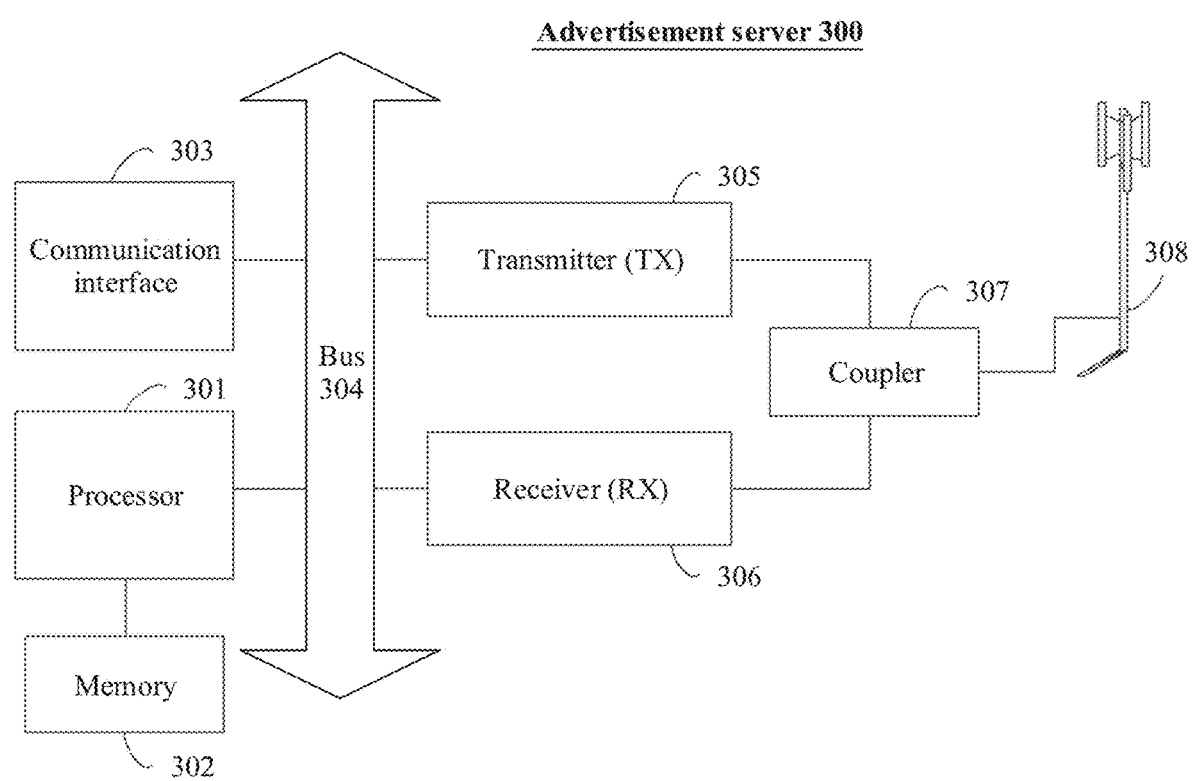
FIG. 3E is a schematic diagram of a structure of an advertisement server according to an embodiment of this application.

FIG. 3E illustrates a structure of an advertisement server 300 according to an embodiment of this application.

As shown in FIG. 3E, the advertisement server 300 may include: one or more processors 301, a memory 302, a communication interface 303, a transmitter 305, a receiver 306, a coupler 307, and an antenna 308. These components may be connected by using a bus 304 or in another manner. In FIG. 3E, that the components are connected by using the bus is used as an example.

In this embodiment of this application, the processor 301 may be configured to read and execute computer-readable instructions. Specifically, the processor 301 may be configured to invoke a program stored in the memory 302, for example, a program that is provided in one or more embodiments of this application and that implements the following method on the side of the first application server 200: Search for a corresponding advertisement based on an advertising space ID; send the advertisement to the electronic device 100; and execute instructions included in the program.

The memory 302 is coupled to the processor 301, and is configured to store various software programs and/or a plurality of groups of instructions. Specifically, the memory 302 may include a high-speed random access memory, or a non-volatile memory, for example, one or more disk storage devices, a flash memory device, or another non-volatile solid-state storage device.

The memory 302 may store an operating system (briefly referred to as a system below), for example, an embedded operating system such as uCOS, VxWorks, or RTLinux. The memory 302 may further store a network communication program, where the network communication program may be used to communicate with the advertisement server 200 and the electronic device 100.

In this embodiment of this application, the memory 202 may store an advertising space ID of a first application, an advertisement corresponding to the advertising space ID, and an advertisement landing page corresponding to the advertisement corresponding to the advertising space ID.

In some embodiments, the memory 202 may further store a whitelist. The whitelist includes a plurality of preset applications with relatively high security levels.

The communication interface 303 may be configured for the advertisement server 300 to communicate with another communication device, for example, electronic devices 1001-1003 and the first application server 200. Specifically, the communication interface 303 may be a 3G communication interface, a Long Term Evolution (LTE) (4G) communication interface, a 5G communication interface, a WLAN communication interface, a WAN communication interface, or the like. In addition to a wireless communication interface, the advertisement server 300 may be further provided with a wired communication interface 303 to support wired communication. For example, a backhaul link between the advertisement server 300 and the first application server 200 may be a wired communication connection.

In this embodiment of this application, the communication interface 203 may further include an API. The API may be configured for the electronic device 100 to request the advertisement corresponding to the advertising space ID through the first application server 200.

In some embodiments of this application, the transmitter 305 and the receiver 306 may be considered as a wireless modem. The transmitter 305 may be configured to perform transmission processing on a signal output by the processor 301. The receiver 306 is configured to receive a signal. In the advertisement server 300, there may be one or more transmitters 305 and one or more receivers 306. The antenna 308 may be configured to: convert electromagnetic energy in a transmission line into an electromagnetic wave in free space, or convert an electromagnetic wave in the free space into electromagnetic energy in the transmission line. The coupler 307 may be configured to split a mobile communication signal into a plurality of signals, and distribute the plurality of signals to a plurality of receivers 306. It may be understood that the antenna 308 of the network device may be implemented as a large-scale antenna array.

It should be noted that the advertisement server 300 shown in FIG. 3E is merely an implementation of this embodiment of this application. In actual application, the advertisement server 300 may further include more or fewer components. This is not limited herein.

Based on the foregoing detailed descriptions of the communication system 10 shown in FIG. 3A and the electronic device 100, the first application server 200, and the advertisement server 300 that are in the communication system 10, an advertisement display method provided in embodiments of this application is described below in detail with reference to a method flowchart and a series of user interfaces.

In the advertisement display method provided in the embodiments of this application, after the electronic device 100 requests, from the first application server 200 in response to an operation of a user, a first page provided by a first application, the first application server 200 obtains information about first application content and first advertisement information (an advertising space ID and a position of an advertising space in the first page) in the first page; obtains corresponding application content based on the information about the application content; and obtains second advertisement information corresponding to the advertising space ID (an advertisement corresponding to the advertising space ID) from the advertisement server 300 based on the advertising space ID. Then, the first application server 200 sends the information about the application content, the application content, the first advertisement information, and the second advertisement information to the electronic device 100. The electronic device 100 displays the application content at the position of the application content in the first page, and displays, in the advertising space, the advertisement corresponding to the advertising space ID. In this way, the electronic device 100 is enabled to display, in the first page, both the application content and the advertisement corresponding to the advertising space ID, thereby improving advertisement display efficiency and improving advertising experience of the user.

Specifically, in the advertisement display method mentioned above, the second advertisement information obtained by the advertisement server 300 further includes a second advertisement landing page address corresponding to an advertising element in the advertisement corresponding to the advertising space ID. After displaying the advertisement in the advertising space in the first page, the electronic device 100 may obtain, in response to a detected operation used for displaying an advertisement landing page, an advertisement in a corresponding advertisement landing page based on the second advertisement landing page address, and display the advertisement landing page.

In some embodiments, the electronic device 100 is integrated with a system-level Adskit. The Adskit is a system module, and may provide an advertisement service for all applications in the electronic device 100. Specifically, the Adskit may obtain the advertisement landing page address sent by the advertisement server 300 through the first application server 200, obtain the corresponding advertisement landing page based on the address, and then display the advertisement landing page on a display of the electronic device 100.

In some embodiments, the electronic device 100 is further integrated with a system-level VR/AR engine. The system-level VR/AR engine may be invoked by a system application installed in the electronic device 100. For example, when the advertisement landing page is configured to provide a VR/AR service, because both the Adskit and the system-level VR/AR engine in the electronic device 100 belong to a system application that is preset in the electronic device 100, the Adskit may directly invoke the system-level VR/AR engine, and provide the VR/AR service in the advertisement landing page by using the VR/AR engine.

In some embodiments, the electronic device 100 may further store a whitelist. The whitelist includes a plurality of preset applications with relatively high security levels. When the advertisement landing page displayed by the electronic device 100 is configured to provide an installation service of an application, after the user confirms installation of the application in the advertisement landing page, the electronic device 100 may directly check whether the application is in the whitelist. If yes, the electronic device may directly download and install the application without obtaining authorization of the user again.

Figure 4A:
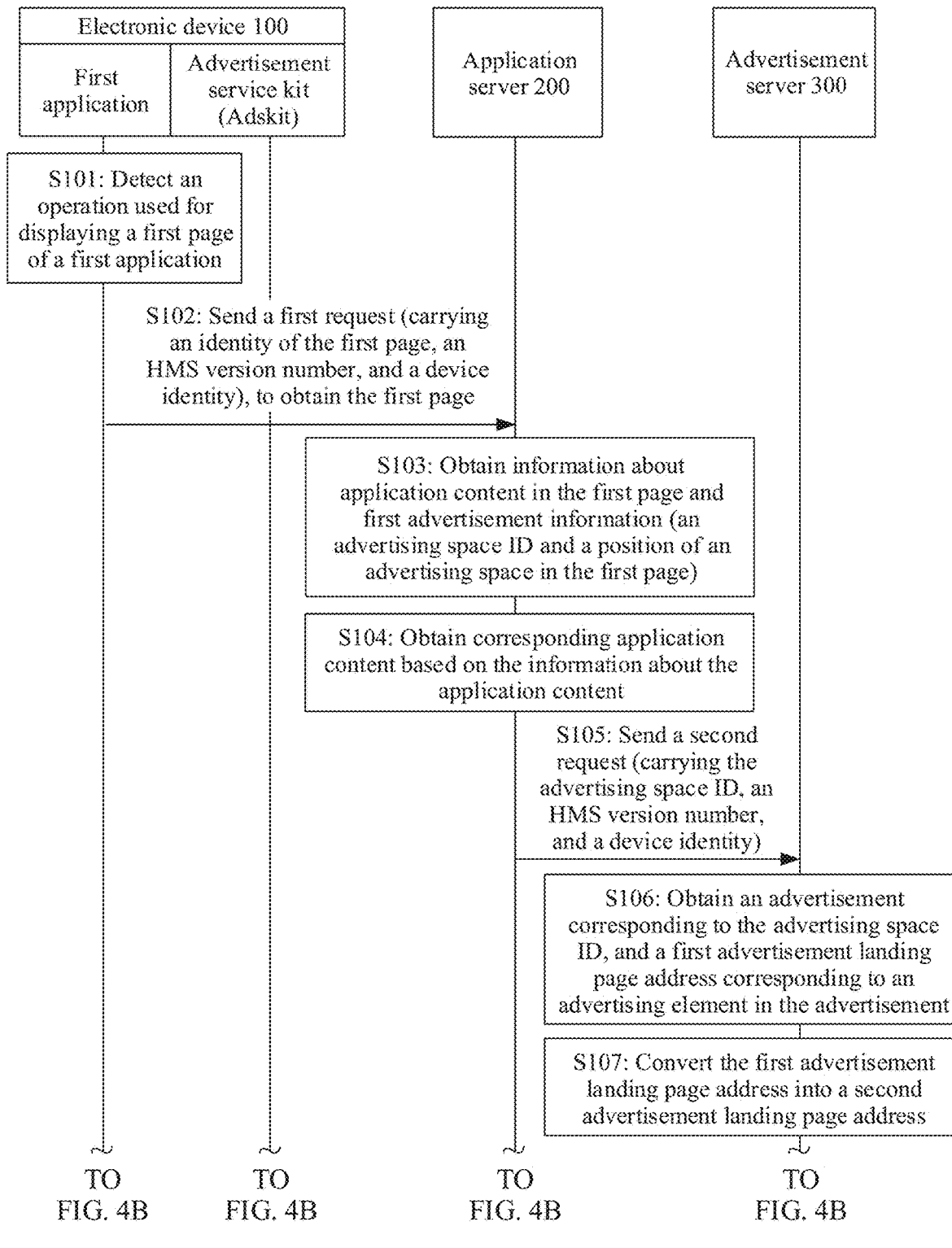
FIG. 4A and FIG. 4B are a schematic flowchart of an advertisement display method according to an embodiment of this application.
Figure 4B:
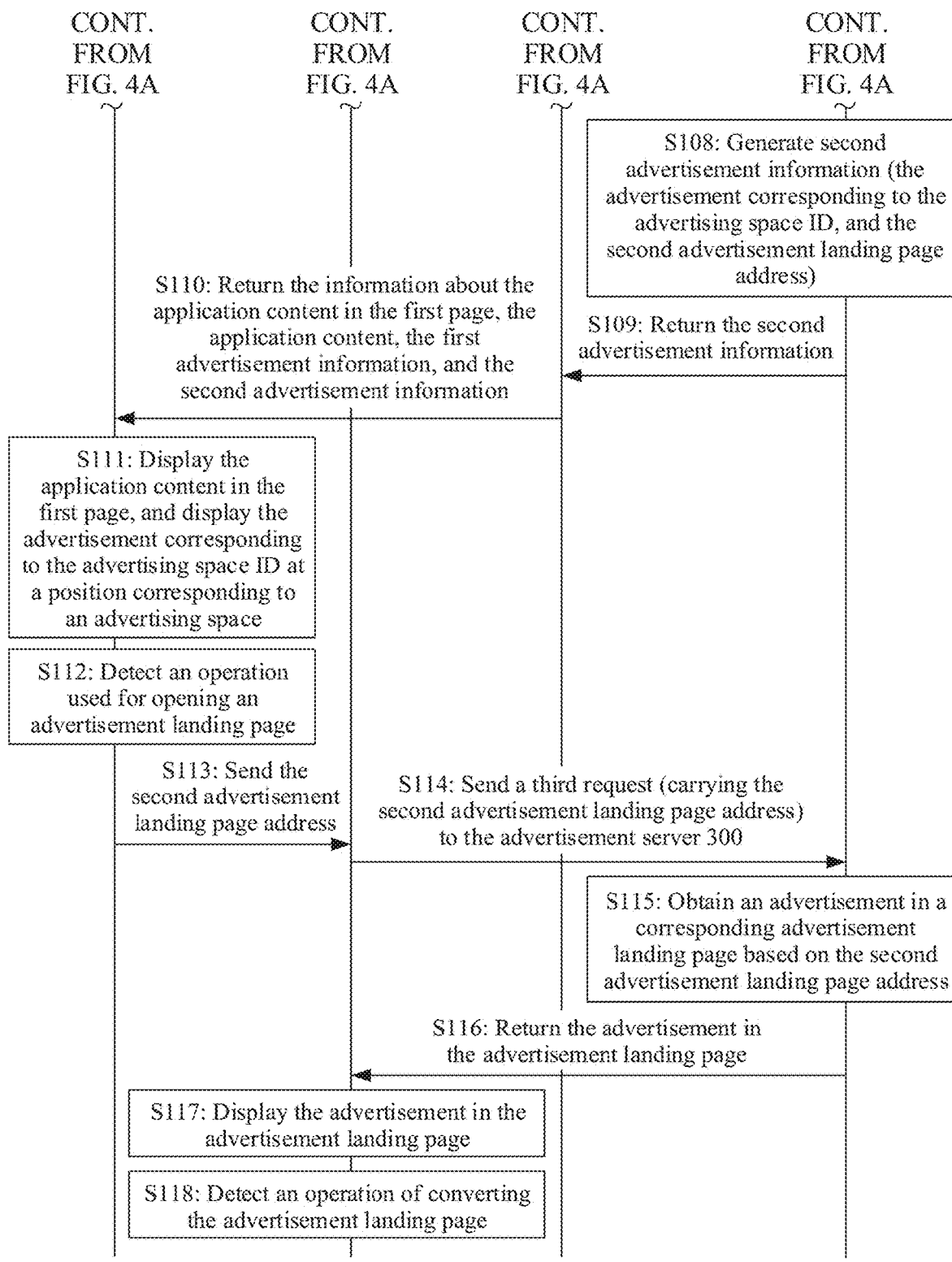

FIG. 4A and FIG. 4B illustrate a procedure of an advertisement display method according to an embodiment of this application. Details are as follows:

S101: The electronic device 100 detects a first operation used for displaying a first page of a first application.

In this embodiment of this application, the first operation is an operation used for triggering the electronic device 100 to display the first page. The first page may be any page provided by the first application, for example, a home page or another subpage. Specifically, the first operation may be a touch operation (for example, an operation of tapping a first application icon, or an operation of switching a page of the first application (for example, an operation of tapping a next page and an operation of sliding through a page)), a voice instruction, a shake operation, or the like.

Figure 5A:
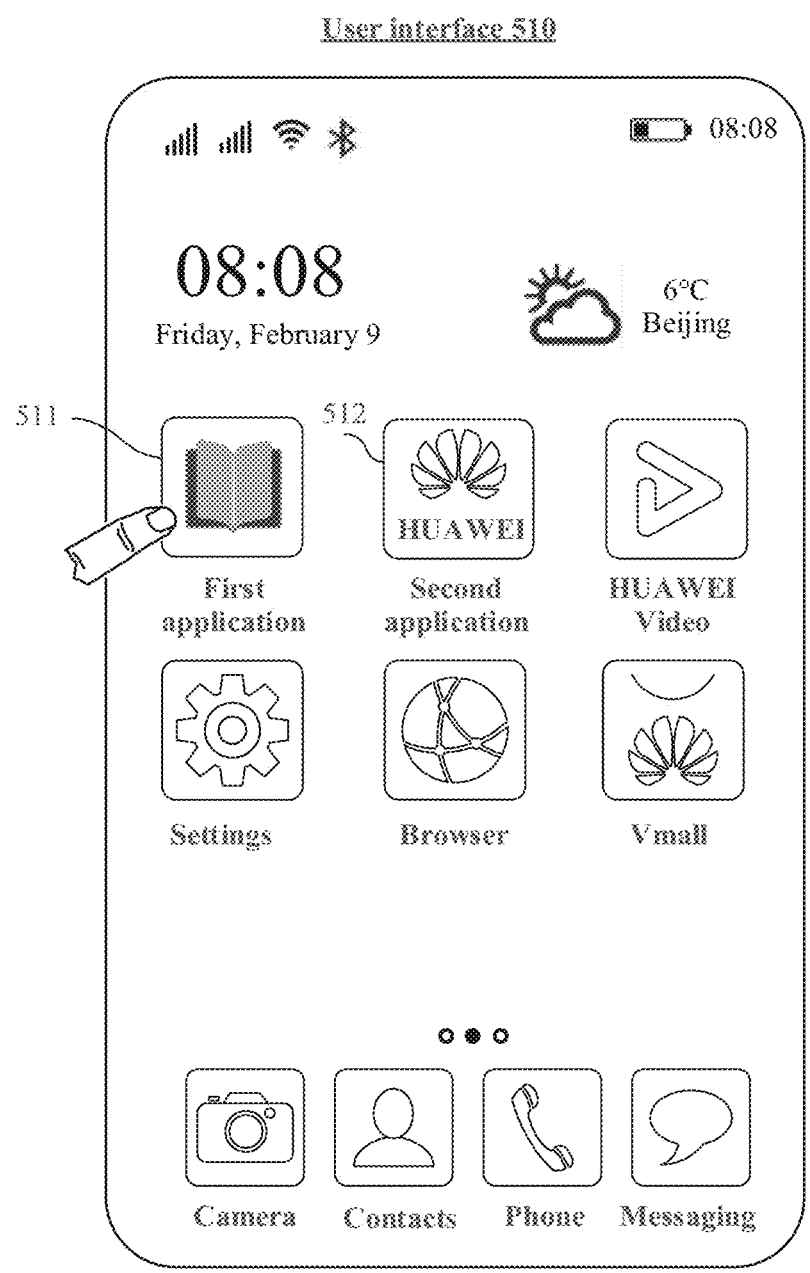
FIG. 5A to FIG. 5G are schematic diagrams of a group of user interfaces according to an embodiment of this application.

FIG. 5A illustrates a user interface 510 configured to display an application installed in the electronic device 100. The user interface 510 includes an icon of an application installed in the electronic device 100, for example, a first application icon 511, a Huawei mobile services application icon 512, and an application icon corresponding to another application.

As shown in FIG. 5A, when displaying the user interface 510 shown in FIG. 5A, the electronic device 100 may detect an operation that is entered by a user and that is of tapping the first application icon 511 shown in FIG. 5A.

S102: The electronic device 100 sends a first request to the first application server 200 in response to the detected first operation.

In response to the detected first operation, the electronic device 100 may send the first request to the first application server 200 through a mobile communication network or a wireless communication network, to obtain the first page.

In this embodiment of this application, the first request carries a page identity of the first page. The page identity of the first page may be used by the first application server to obtain information about first application content in the first page and first advertisement information (an advertising space ID and a position of an advertising space in the first page). For detailed descriptions, refer to the following step S102. Details are not described herein.

In some embodiments, when the electronic device 100 starts a first application and displays a splash advertisement in the first application, the first request carries an advertising space ID corresponding to the splash advertisement, and the advertising space ID is pre-stored in the first application.

In some embodiments, the first request further carries one or more of the following: a device identity, an HMS version number, a user identity, and device position information.

The device identity is an international mobile equipment identity (international mobile equipment identity, IMEI) or an open anonymous device identifier (open anonymous device identifier, OAID). The IMEI is used to uniquely identify an identity of the electronic device 100 in a communication network, and is equivalent to an identity card of the electronic device 100. The IMEI may be pasted to a back or an outer package of the electronic device 100, and stored in a memory of the electronic device 100. The OAID is a number used to uniquely identify the identity of the electronic device 100, and is stored in the memory of the electronic device 100.

The HMS version number is a version number of an HMS application. HMS applications having different version numbers support different functions. In this embodiment of this application, an HMS version is required to support aversion of an advertisement service kit (Adskit).

The user identity is an account of a current user who logs in to the first application.

The device position information is a current geographical position of the electronic device 100.

The device identity, the HMS version number, the user identity, the device position information, and the like may be used by the first application server 200 to request the advertisement server 300 to obtain an advertisement corresponding to the first page. Then, the advertisement server further selects, based on one or more of the device identity, the HMS version number, the user identity, and the device position information, an advertisement from advertisements corresponding to an advertising space ID in the first page. For detailed descriptions, refer to the following steps S104 and S105. Details are not described herein.

In this embodiment of this application, the position of the advertising space in the first page is also referred to as a first position.

S103: The first application server 200 obtains information about corresponding application content and first advertisement information based on an identity of the first page.

After receiving the first request sent by the electronic device 100, the first application server 200 may obtain, based on the identity of the first page and in the first request, the information about the first application content and the first advertisement information in the first page.

Specifically, the first application server 200 pre-stores information about application content in each page of the first application and the first advertisement information. The information about the application content includes but is not limited to an application content ID, a position of the application content in the first page, a format of the application content, and the like. The first advertisement information includes the advertising space ID, the position of the advertising space in the first page, and the like.

The application content ID is an identity of application content displayed in the first page of the first application. The first application server 200 may obtain corresponding application content based on the identity and send the corresponding application content to the electronic device 100. For details, refer to the following step S103.

The advertising space ID is an identity of an advertising space in the first application. The advertising space ID is obtained by a developer of the first application through application to an advertising platform. When the developer develops the first application, the advertising space ID is integrated into the first application, and is also stored in the first application server 200. The first application server 200 may request a corresponding advertisement from the advertisement server based on the advertising space ID. For details, refer to the following step S104.

In some embodiments, the advertising space ID is obtained by the first application server based on the identity of the first page and in the first request.

In some other embodiments, when the electronic device 100 detects the first operation of starting the first application and displaying a splash advertisement in the first application, the advertising space ID may be obtained from the first request of the electronic device 100.

S104: The first application server 200 obtains the corresponding application content based on an application content ID.

The first application server 200 pre-stores the application content in each page of the first application. After obtaining the information about the application content in the first page, the first application server 200 may obtain the corresponding application content based on the application content ID in the information.

It may be understood that step S103 and the following step S104 are performed simultaneously. In other words, after obtaining the information about the application content and the first advertisement information in the first page, the first application server 200 may obtain corresponding application content based on the application content ID in the information about the application content in the first page, and request a corresponding advertisement from the advertisement server 300 based on the advertising space ID in the first advertisement information.

S105: The first application server 200 sends a second request to the advertisement server 300.

Specifically, the advertisement server 300 may provide an API, through which the first application server 200 sends the second request to obtain the advertisement corresponding to the advertising space ID. The API provided by the advertisement server 300 may be defined as follows: [GET]/hwads?hmsVersion=xxx&oaid=xxx&slotId=xxx, where "hmsVersion=xxx" defines an HMS version number, "oaid=xxx" defines an OAID, and "slotid" defines an advertising space ID.

It may be understood that the API defined by the advertisement server 300 is merely an example, and should not constitute a limitation on this embodiment of this application.

In this embodiment of this application, the second request carries the advertising space ID.

In some embodiments, the request further carries one or more of a device identity, an HMS version number, a user identity, and device position information.

S106: The advertisement server 300 obtains a corresponding advertisement based on an advertising space ID, and obtains a first advertisement landing page address corresponding to an advertising element in the advertisement.

Specifically, the advertisement server 300 may provide an API, and receive, through the API, the second request that is sent by the first application server and that is used for obtaining the advertisement corresponding to the advertising space ID.

In this embodiment of this application, the advertisement server 300 obtains the corresponding advertisement based on the advertising space ID in the request sent by the first application server 200. The advertisement includes one or more advertising elements. The advertisement server 300 may obtain one or more advertisements based on the advertising space ID.

In some embodiments, when the advertisement server 300 obtains one or more advertisements based on the advertising space ID, the advertisement server 300 may further select, according to a specific selection policy, an advertisement to be displayed in the first page from the advertisements corresponding to the advertising space ID. The policy may include: The advertisement server 300 further selects an advertisement based on one or more of the device identity, the HMS version number, the user identity, and the device position information.

For example, the advertisement server 300 may select, based on the device identity, an advertisement that is delivered by an advertiser and that is targeted on a device corresponding to the device identity.

For another example, the advertisement server 300 may select, based on the HMS version number, an advertisement that can be supported by an HMS application of the version number. Specifically, when an HMS version is an earlier version, the advertisement server may filter out an advertisement corresponding to an advertisement landing page that needs a VR/AR engine, or filter out an advertisement corresponding to an advertisement landing page on which an application can be directly installed without authorization of the user, to obtain remaining advertisements.

For still another example, the advertisement server 300 may obtain a user profile of the user based on the user identity, and select an advertisement in which the user may be interested.

For yet another example, the advertisement server 300 may select, based on the device position information, an advertisement that is delivered by the advertiser and targeted on an electronic device in a specific region.

In this way, based on a plurality of advertisement screening policies, the user can learn an advertisement in which the user is more interested, thereby improving advertising experience of the user.

In some embodiments, the advertisement server 300 pre-stores the first advertisement landing page address. The first advertisement landing page address is described in a first language. For example, the first advertisement landing page address is "http://landingpage?" provided by a website. After obtaining the advertisement corresponding to the advertising space ID, the advertisement server 300 may further obtain a first advertisement landing page address corresponding to each advertising element in the advertisement. Different advertising elements correspond to different first advertisement landing page addresses or a same first advertisement landing page address.

In this embodiment of this application, the advertisement corresponding to the advertising space ID is also referred to as a first advertisement.

S107: The advertisement server 300 converts the first advertisement landing page address into a second advertisement landing page address according to an address translation rule.

Herein, the second advertisement landing page address is an advertisement landing page address described by the Adskit in a second language, for example, a Deeplink address. The Deeplink address can be used to jump from a page displayed by an application to any page displayed by another application. Specifically, the advertisement server 300 pre-stores an address translation rule pre-agreed with the Adskit, and converts, according to the address translation rule, the first advertisement landing page address into the second advertisement landing page address that can be identified by the Adskit.

The address translation rule may be: For example, if the first advertisement landing page address is "http://landingpage?" provided by the website, the second advertisement landing page address after conversion may be "hwpps://landingpage?contentID=xxxxx" provided by the Adskit, where contentID in the second advertisement landing page address is generated by the advertisement server 300 and is used for identifying an advertising element in an advertisement landing page corresponding to the second advertisement landing page address.

A definition of the second advertisement landing page address "hwpps://landingpage?contentID=xxxxx" in the Adskit may be shown in the following example:

```
<activity>
    android:name="com.huawei.LandingpageActivity"
    android:configChanges="keyboardHidden|orientation|screenSize|screenLayout|smallestScreenSize"
    android:exported="true"
    android:theme="@android:style/Theme.DeviceDefault">
    <intent-filter>
    <action android:name="android.intent.action.VIEW" />
    <category android:name="android.intent.category.DEFAULT" />
    <category android:name="android.intent.category.BROWSABLE" />
    <data
    android:host="landingpage" (Define an advertisement landing page.)
    android:scheme="hwpps" /> (Define an advertisement landing page address.)
    </intent-filter>
</activity>
```

Refer to a definition of the second advertisement landing page in the Adskit. When the first application in the electronic device 100 detects an operation performed by the user and used for opening an advertisement landing page, the first application may send the second advertisement landing page address to the Adskit, and invoke the Adskit to display the corresponding advertisement landing page. For details, refer to the following descriptions of S109 to S114.

S108: The advertisement server 300 generates second advertisement information.

In this embodiment of this application, the second advertisement information includes the advertisement corresponding to the advertising space ID.

In some embodiments, the second advertisement information includes the advertisement corresponding to the advertising space ID, and the second advertisement landing page address.

S109: The advertisement server 300 sends the second advertisement information to the first application server 200.

S110: The first application server 300 sends the information about the application content in the first page, the application content, the first advertisement information, and the second advertisement information to the electronic device 100.

In this embodiment of this application, the first application server 200 sends the information about the application content in the first page, the application content, the first advertisement information, and the second advertisement information to the electronic device 100.

S111: The electronic device 100 displays the application content at a position of the application content in the first page, and displays the advertisement corresponding to the advertising space ID at a position corresponding to an advertising space.

Figure 5B:
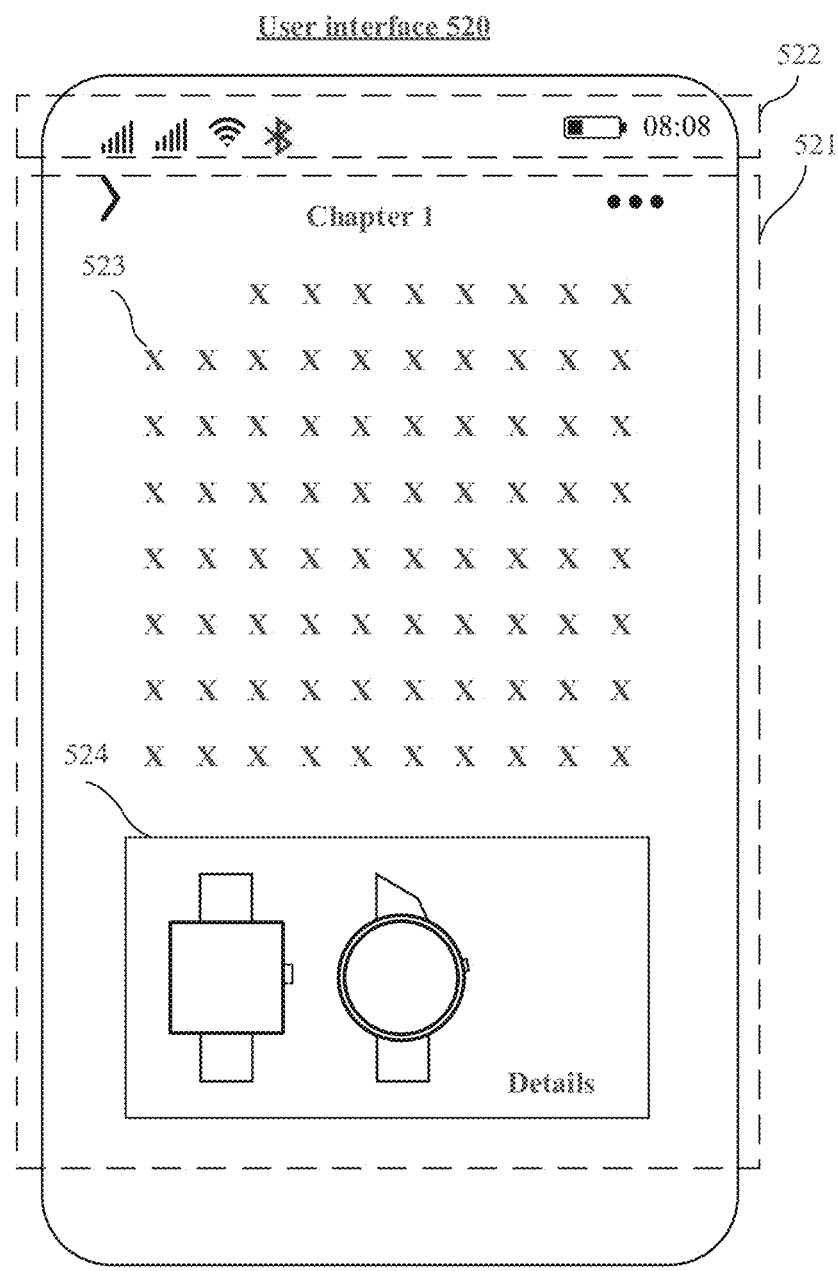

FIG. 5B illustrates a user interface 520 of the first application displayed by the electronic device 100.

As shown in FIG. 5B, the user interface 520 includes a first page 521 and a status bar 522. The first page 521 displays application content 523, an advertising space 524, and a corresponding advertisement displayed in the advertising space 524. The advertisement includes a series of advertising elements.

The advertising elements may include a static image, a graphics interchange format (graphics interchange format, GIF) image, a text, a video, and the like.

The first application server 200 may request the advertisement from the advertisement server 300 (for details, refer to the foregoing steps S103 and S104) when obtaining the application content. In this way, a display delay of the advertisement can be reduced, and display efficiency of the advertisement can be improved. Therefore, the user can watch the application content and the advertisement at the same time in the first page, and an icon displayed in the advertising space and indicating that the advertisement is being loaded is no longer visible to the user. This makes the user have better watching experience.

In this embodiment of this application, the user interface 520 displayed by the electronic device is also referred to as a first interface.

In some embodiments, the procedure of the advertisement display method shown in FIG. 4A and FIG. 4B may further include the following steps:

S112: The electronic device 100 detects an operation used for opening an advertisement landing page.

Figure 5C:
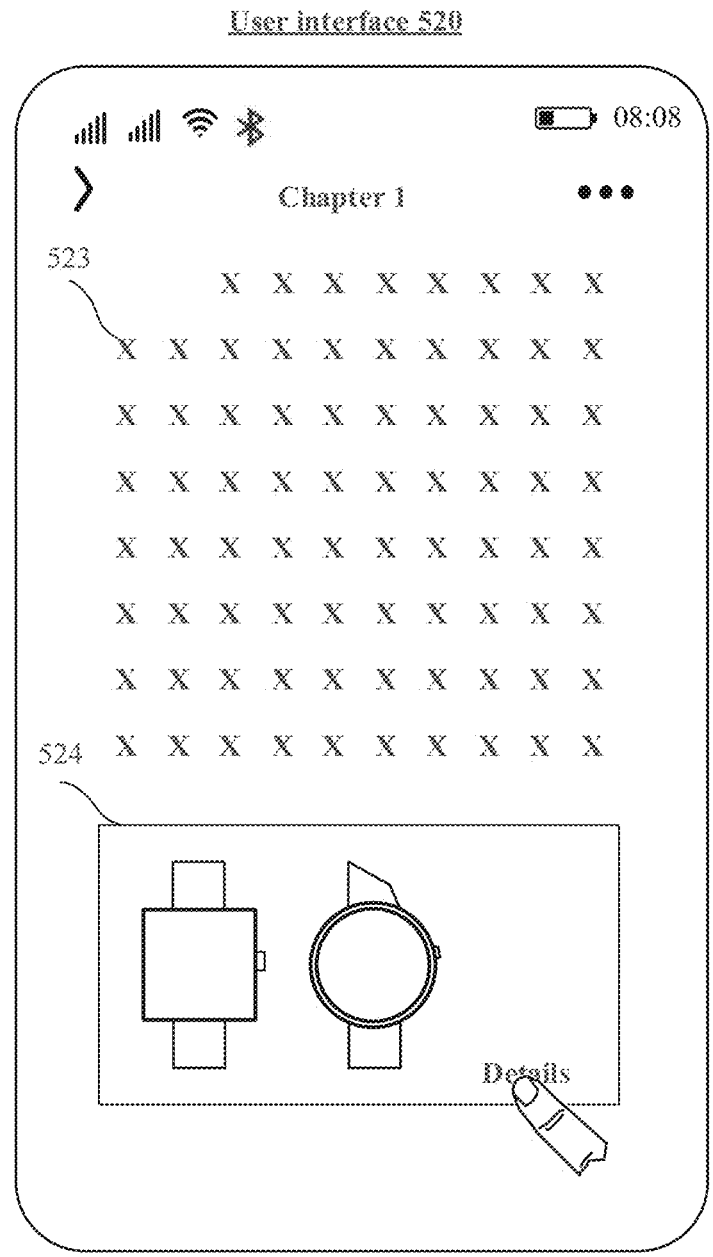
Figure 5D:
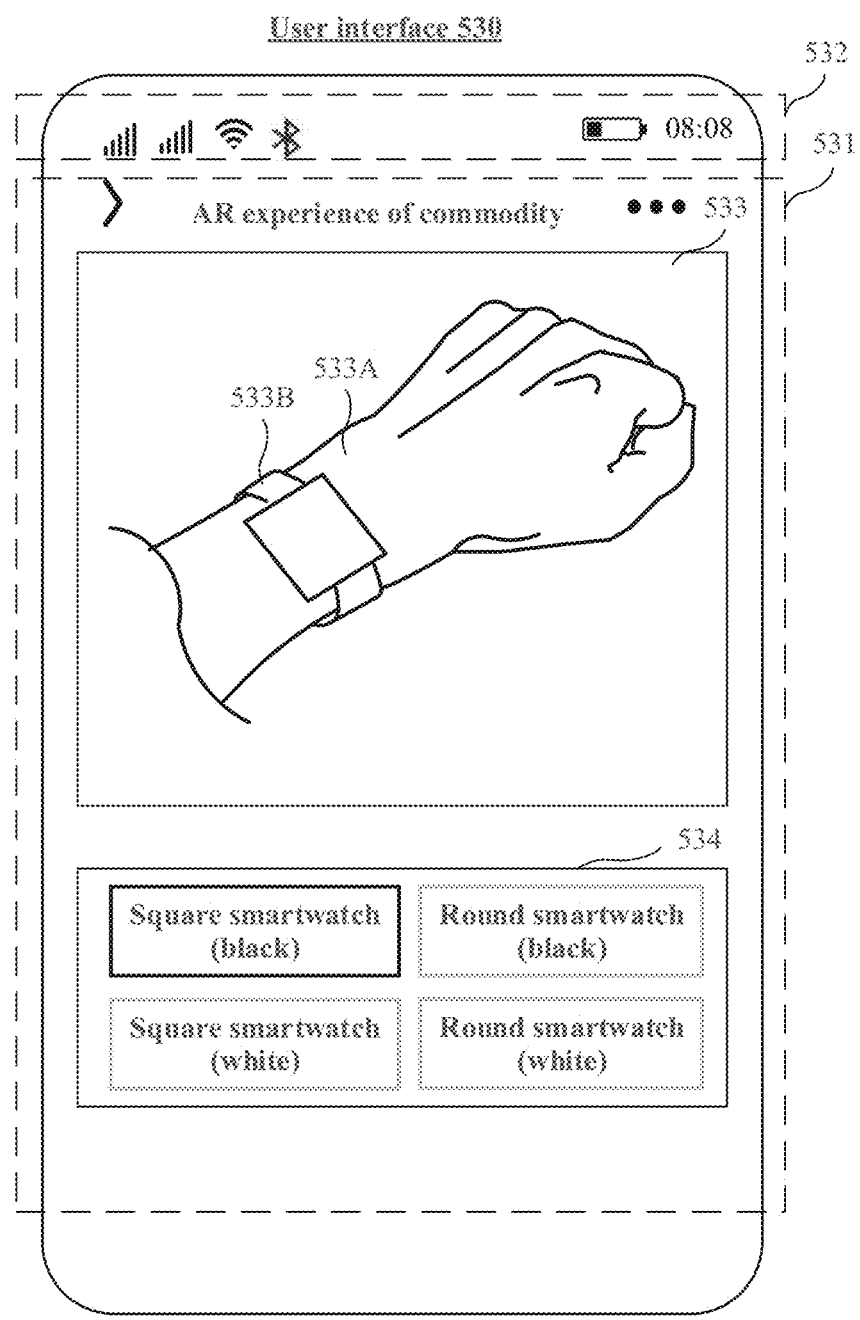
Figure 5E:
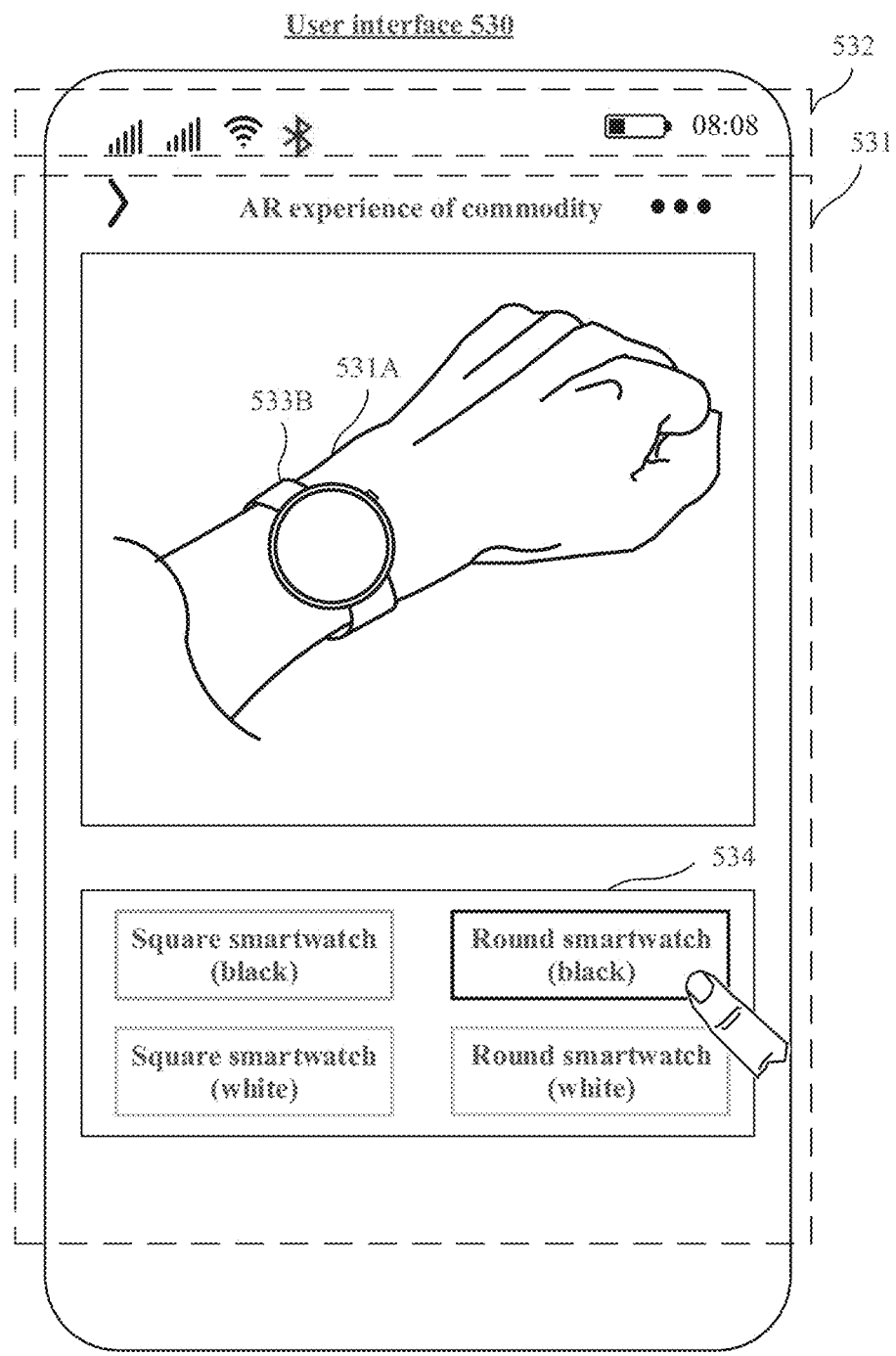

The operation used for opening the advertisement landing page may be an operation of tapping an advertising element in the advertising space. FIG. 5C shows an example in which the electronic device 100 detects an operation of tapping an advertising element "Details" in the advertising space.

In some embodiments, the operation used for opening the advertisement landing page may be an operation of tapping any position in the advertising space.

In this embodiment of this application, the foregoing operation used for opening the advertisement landing page is also referred to as a second operation.

S113: The electronic device 100 sends, by using the first application, the second advertisement landing page address to the Adskit in response to the detected operation used for opening the advertisement landing page.

S114: The Adskit sends a third request (carrying the second advertisement landing page address) to the advertisement server, to obtain an advertisement in a corresponding advertisement landing page.

First, after receiving the second advertisement landing page address sent by the first application, the Adskit may invoke an internally stored program that defines the second advertisement landing page address, to identify the second advertisement landing page address. Then, the Adskit may request the advertisement in the advertisement landing page corresponding to the second advertisement landing page address from the advertisement server 300 through an advertisement information query interface that is provided by the advertisement server 300 for the Adskit.

S115: The advertisement server 300 obtains the advertisement in the corresponding advertisement landing page based on the second advertisement landing page address.

In this embodiment of this application, the advertisement server 300 may search for the advertisement in the corresponding advertisement landing page based on the contentID in the second advertisement landing page address.

S116: The advertisement server 300 sends the obtained advertisement in the advertisement landing page to the Adskit.

S117: The Adskit displays, in the advertisement landing page, the advertisement obtained in step S116.

If the advertisement landing page is configured to provide a VR/AR service, the Adskit may directly invoke a system-level VR/AR engine, and provide the VR/AR service in the advertisement landing page by using the VR/AR engine.

FIG. 5D and FIG. 5E illustrate a series of user interfaces that are of the electronic device 100 and that display the advertisement landing page and provide an AR service in the advertisement landing page for the user.

FIG. 5D illustrates a user interface 530 that is of the electronic device 100 and that displays the advertisement landing page. The user interface 530 includes an advertisement landing page 531 and a status bar 532. The advertisement landing page 531 displays an AR preview window 533 and an option bar 534. In this embodiment of this application, the user interface 530 is also referred to as a second interface. In this embodiment of this application, an advertising element displayed in the advertisement landing page 531 is also referred to as a VR/AR material. The AR preview window 533 is configured to display commodity preview information processed by using an AR technology, for example, a hand 533A and a watch 533B. The hand 533A is a real image captured by a camera of the electronic device 100, and the watch 533B is a virtual image in an advertising element. The electronic device 100 may combine the hand 533A with the watch 533B by using a system-level AR engine, that is, display, in the AR preview window 533, an image in which the watch 533B is worn on the hand 533A. Therefore, an AR service for experience of trying on the watch is provided for the user.

The option bar 534 includes options such as square smartwatch (black), square smartwatch (white), round smartwatch (black), and round smartwatch (white). The electronic device 100 may display, in the AR preview window 533 in response to detecting operations of tapping different options by the user, preview information of different styles of watches that correspond to the different options. When the electronic device 100 displays the advertisement landing page 531 for the first time, the square smartwatch (black) option is selected in the option bar by default, and the AR preview window 533 displays, by default, that the watch 533B worn on the hand is a black square smartwatch corresponding to the option.

FIG. 5E shows an example in which the electronic device 100 displays, in the AR preview window 531 in response to detecting an operation performed on the round smartwatch (black) option, an image in which the hand wears a black round smartwatch. In this way, an AR service for experience of trying on the watch is provided for the user.

It may be understood that, the series of user interfaces that are shown in FIG. 5D and FIG. 5E and that provide the AR service in the advertisement landing page for the user are merely examples, and should not constitute a limitation on this embodiment of this application.

It can be learned that, after a method for displaying an advertisement landing page by using the Adskit is implemented, because the Adskit can be shared by applications in the electronic device 100, not all the applications need to integrate advertisement SDKs. Therefore, a size of an application APK can be reduced.

In addition, the electronic device 100 is further integrated with a system-level VR/AR engine. When the advertisement landing page is configured to provide a VR/AR service, because both the Adskit and the system-level VR/AR engine in the electronic device 100 belong to a system application that is preset in the electronic device 100, the Adskit may directly invoke the system-level VR/AR engine, and provide the VR/AR service in the advertisement landing page by using the VR/AR engine. In this way, a user can experience a VR/AR service in the advertisement landing page without needing to install a VR/AR engine invoked by a third-party application, so that operations of the user are simplified. Therefore, advertising experience of the user is improved, and then, conversion efficiency of the advertisement landing page is improved.

S118: The electronic device 100 detects an operation of converting the advertisement landing page.

When the Adskit in the electronic device 100 displays the advertisement landing page, if the advertisement landing page is configured to provide a service of installing an application, the operation of converting the advertisement landing page is: After the user confirms installation of the application, the Adskit in the electronic device 100 may directly check whether the application is in a whitelist. If yes, the electronic device may directly download and install the application without obtaining authorization of the user again.

Figure 5F:
Figure 5G:

In response to detecting an operation used for displaying the advertisement landing page, for example, an operation, illustrated in FIG. 5C and detected by the electronic device 100, of tapping the advertising element "Details" in the advertising space, the electronic device 100 displays a series of user interfaces that are shown in FIG. 5F and FIG. 5G and that provide an application installation service in the advertisement landing page for the user.

A user interface 540 shown in FIG. 5F includes an advertisement landing page 541 and a status bar 542. The advertisement landing page 541 displays a playback window 543, a control 543A, an application icon 544, a text 545, and a control 546. In this embodiment of this application, the user interface 540 is also referred to as a second interface.

The playback window 543 may display a video used for introducing and promoting an application. For example, in response to detecting an operation performed on the control 543A, the electronic device 100 may continuously play, in the playback window 543, a video that promotes the application "Health". The application icon 544 is an application icon corresponding to the application "Health". The text 545 is used for describing the name of the application corresponding to the application icon 544 and the size of the installation package of the application. The control 546 is used for triggering the electronic device 100 to install the application.

In response to detecting an operation performed on the control 546 shown in FIG. 5F, the electronic device 100 may directly check whether the application is in the whitelist. If yes, the electronic device 100 may directly download and install the application "Health" in the advertisement landing page without obtaining authorization of the user again. The operation performed on the control 546 shown in FIG. 5F is also referred to as a fourth operation.

The whitelist includes a plurality of preset applications with relatively high security levels. The security level of an application may be considered in multiple dimensions. For example, a larger permission range of the application indicates a lower security level, or a specific category (for example, an education and learning category) or the like of the application indicates a higher security level. This is not limited herein. The whitelist may be obtained by the electronic device 100 from the advertisement server 300, or may be obtained from a vendor of the electronic device 100, or may be preset in the electronic device 100.

FIG. 5G illustrates a user interface 540 in which the electronic device 100 installs the application. As shown in FIG. 5G, the user interface 540 displays an application installation progress 547, used for notifying the user of a current installation progress of the application.

It may be understood that, the user interfaces that are shown in FIG. 5F and FIG. 5G and that provide the application installation service in the advertisement landing page are merely examples, and should not constitute a limitation on this embodiment of this application.

It can be learned that, after a method for displaying an advertisement landing page by using the Adskit is implemented, because the electronic device 100 may further store the whitelist, when the advertisement landing page displayed by the electronic device 100 is configured to provide an installation service of an application, after the user confirms installation of the application in the advertisement landing page, the electronic device 100 may directly check whether the application is in the whitelist. If yes, the electronic device may directly download and install the application without obtaining authorization of the user again. In this way, the user can implement the installation of the application by performing only one operation of confirming the installation of the application. This not only ensures security of the application, but also reduces repeated operations of confirming the installation of the application, thereby improving advertising experience of the user, and then improving conversion efficiency of the advertisement landing page.

It may be understood that the first application may display an advertisement by using the advertisement display method shown in FIG. 1A and FIG. 1B and the advertisement display method shown in FIG. 4A and FIG. 4B.

For example, when the first application displays an advertisement A in the advertising space, the method including steps S101 to S107 shown in FIG. 4A and FIG. 4B may be used to display the advertisement A in the advertising space in the first application. In response to detecting the operation used for opening the advertisement landing page, the first application may display the advertisement landing page in the first application according to the method including steps 11 to 13 shown in FIG. 1A and FIG. 1B. It should be noted that in this case, as shown in FIG. 4A and FIG. 4B, the advertisement server sends the first advertisement landing page address in step S106, and the first application server returns the first advertisement landing page address in step S107.

For another example, when the first application displays the advertisement A in a first advertising space, and displays an advertisement B in a second advertising space, the electronic device 100 may display the advertisement A in the first advertising space according to the method shown in FIG. 1A and FIG. 1B, and display the advertisement landing page in the first application in response to detecting the operation used for opening the advertisement landing page. The electronic device 100 may display the advertisement B in the second advertising space according to the method shown in FIG. 4A and FIG. 4B, and display the advertisement landing page in the Adskit in response to detecting the operation used for opening the advertisement landing page.

It can be learned that, after the advertisement is displayed according to the methods shown in FIG. 1A and FIG. 1B and FIG. 4A and FIG. 4B, different implementation methods may be flexibly selected based on advertisement service types that can be provided in the electronic device 100, to display the advertisement.

The advertisement service type may include: providing an advertisement service for the first application by using an advertisement SDK, and providing an advertisement service for the first application by using an Adskit. For example, when the advertisement SDK cannot be integrated into the first application in the electronic device 100, the advertisement may be displayed according to the method shown in FIG. 4A and FIG. 4B. For another example, when no Adskit is integrated into the electronic device 100, the method shown in FIG. 1A and FIG. 1B may be used to display an advertisement. For another example, when the first application in the electronic device 100 is integrated with the advertisement SDK, and the electronic device 100 is integrated with the Adskit, the advertisement may be displayed according to the method shown in FIG. 1A and FIG. 1B or the method shown in FIG. 4A and FIG. 4B.

The implementations of this application may be randomly combined, to achieve different technical effects.

Some or all of the foregoing embodiments may be implemented by using software, hardware, firmware, or any combination thereof. When software is used to implement the embodiments, some or all of the embodiments may be implemented in a form of a computer program product. The computer program product includes one or more computer instructions. When the computer instructions are loaded and executed on the computer, the processes or functions according to this application are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk)), or the like.

A person of ordinary skill in the art may understand that some or all of the processes of the methods in embodiments may be implemented by a computer program instructing related hardware. The program may be stored in a computer-readable storage medium. When the program is executed, the processes of the foregoing method embodiments may be performed. The foregoing storage medium includes any medium that can store program code, such as a ROM, a random access memory RAM, a magnetic disk, or an optical disc.

In conclusion, the foregoing descriptions are merely embodiments of the technical solutions of the present invention, but are not intended to limit the protection scope of the present invention. Any modification, equivalent replacement, or improvement made according to the disclosure of the present invention shall fall within the protection scope of the present invention.

What is claimed is:

1. A method, wherein the method comprises:
sending, by an electronic device, a first request to a first server, wherein the first request requests the first server to obtain first advertisement information, the first advertisement information comprises an advertising space identity (ID), the advertising space ID identifies an advertising space, the first request further requests the first server to send a second request to an advertisement server, and the second request comprises the advertising space ID;
receiving, by the electronic device, second advertisement information sent by the first server, wherein the second advertisement information is obtained by the advertisement server based on the advertising space ID in the second request sent by the first server, and the second advertisement information comprises a first advertisement corresponding to the advertising space ID and an advertisement landing page address;
displaying, by the electronic device, a first interface, wherein the first interface comprises the first advertisement and the advertising space identified by the advertising space ID, and the first advertisement is displayed in the advertising space;
before sending the first request to the first server, detecting, by the electronic device, a first operation, wherein the first operation is an operation of navigating to a page of a first application;
after displaying the first interface, detecting, by the electronic device, a second operation;
obtaining, by the electronic device, a corresponding advertisement landing page from the advertisement server based on the advertisement landing page address in response to the second operation; and
displaying a second interface comprising the advertisement landing page.

2. The method according to claim 1, wherein the first request further comprises the advertising space ID.

3. The method according to claim 1, wherein the first advertisement information further comprises a first position, and before the displaying, by the electronic device, the first interface, the method further comprises:

receiving, by the electronic device, the first position sent by the first server, wherein the first advertisement is displayed at the first position in the first interface.

4. The method according to claim 1, wherein the method further comprises:
receiving, by the electronic device, application content sent by the first server, wherein the application content is obtained by the first server in response to the first request, and the first interface further displays the application content.

5. The method according to claim 1, wherein the advertisement landing page comprises a virtual reality (VR)/augmented reality (AR) advertising material.

6. The method according to claim 5, wherein:
after the detecting, by the electronic device, the second operation, the method further comprises:
detecting, by the electronic device, a third operation; and
downloading, by the electronic device, a VR/AR engine in response to the third operation; and
the displaying, by the electronic device, a second interface specifically comprises: invoking, by the electronic device, the VR/AR engine to display the advertisement landing page on the second interface.

7. The method according to claim 1, wherein after the displaying, by the electronic device, the advertisement landing page, the method further comprises:
detecting, by the electronic device, a third operation; and
installing, by the electronic device, a second application in response to the third operation.

8. The method according to claim 7, wherein the electronic device stores an application list, and the application list comprises one or more applications; and
the installing, by the electronic device, the second application in response to the third operation specifically comprises:
detecting, by the electronic device in response to the detected third operation, whether the second application is comprised in the application list, and installing the second application in response to detecting that the second application is comprised in the application list.

9. An electronic device, wherein the electronic device comprises one or more processors and one or more memories, the one or more memories are coupled to the one or more processors, the one or more memories store programming instructions for execution by the one or more processors to cause the electronic device to perform operations comprising:
sending, by the electronic device, a first request to a first server, wherein the first request requests the first server to obtain first advertisement information, the first advertisement information comprises an advertising space identity (ID), the advertising space ID identifies an advertising space, the first request further requests the first server to send a second request to an advertisement server, and the second request comprises the advertising space ID;
receiving, by the electronic device, second advertisement information sent by the first server, wherein the second advertisement information is obtained by the advertisement server based on the advertising space ID in the second request sent by the first server, and the second advertisement information comprises a first advertisement corresponding to the advertising space ID and an advertisement landing page address;
displaying, by the electronic device, a first interface, wherein the first interface comprises the first advertisement and the advertising space identified by the advertising space ID, and the first advertisement is displayed in the advertising space;
before sending the first request to the first server, detecting, by the electronic device, a first operation, wherein the first operation is an operation of navigating to a page of a first application;
after displaying the first interface, detecting, by the electronic device, a second operation;
obtaining, by the electronic device, a corresponding advertisement landing page from the advertisement server based on the advertisement landing page address in response to the second operation; and
displaying a second interface comprising the advertisement landing page.

10. The electronic device according to claim 9, wherein the first advertisement information further comprises a first position, and before the displaying, by the electronic device, a first interface, the operations further comprise:
receiving, by the electronic device, the first position sent by the first server, wherein the first advertisement is displayed at the first position in the first interface.

11. The electronic device according to claim 9, wherein the operations further comprise:
receiving, by the electronic device, application content sent by the first server, wherein the application content is obtained by the first server in response to the first request, and the first interface further displays the application content.

12. The electronic device according to claim 9, wherein:
the advertisement landing page comprises a virtual reality (VR)/augmented reality (AR) advertising material.

13. The electronic device according to claim 12, wherein:
after the detecting, by the electronic device, the second operation, the operations further comprise:
detecting, by the electronic device, a third operation; and
downloading, by the electronic device, a VR/AR engine in response to the third operation; and
the displaying, by the electronic device, a second interface specifically comprises: invoking, by the electronic device, the VR/AR engine to display the advertisement landing page on the second interface.

14. The electronic device according to claim 9, wherein after the displaying, by the electronic device, the advertisement landing page, the operations further comprise:
detecting, by the electronic device, a third operation; and
installing, by the electronic device, a second application in response to the third operation.

15. The electronic device according to claim 14, wherein the electronic device stores an application list, and the application list comprises one or more applications; and
the installing, by the electronic device, the second application in response to the third operation specifically comprises:
detecting, by the electronic device in response to the detected third operation, whether the second application is comprised in the application list, and installing the second application in response to detecting that the second application is comprised in the application list.

16. The electronic device according to claim 9, wherein the first request further comprises the advertising space ID.

* * * * *